(12) United States Patent
Davydov et al.

(10) Patent No.: US 11,070,320 B2
(45) Date of Patent: Jul. 20, 2021

(54) RESOURCE ELEMENT (RE) MAPPING IN NEW RADIO (NR)

(71) Applicant: Apple Inc., Cupertino, CA (US)

(72) Inventors: Alexei Davydov, Nizhny Novgorod (RU); Seung Hee Han, San Jose, CA (US); Debdeep Chatterjee, San Jose, CA (US); Gang Xiong, Portland, OR (US); Victor Sergeev, Nzhny Novgorod (RU); Ajit Nimbalker, Fremont, CA (US); Dmitry Dikarev, Nzhny Novgorod (RU)

(73) Assignee: Apple Inc., Cupertino, CA (US)

( * ) Notice: Subject to any disclaimer, the term of this patent is extended or adjusted under 35 U.S.C. 154(b) by 28 days.

(21) Appl. No.: 16/477,376

(22) PCT Filed: Jun. 15, 2018

(86) PCT No.: PCT/US2018/037709
§ 371 (c)(1),
(2) Date: Jul. 11, 2019

(87) PCT Pub. No.: WO2018/232211
PCT Pub. Date: Dec. 20, 2018

(65) Prior Publication Data
US 2019/0363831 A1      Nov. 28, 2019

Related U.S. Application Data

(60) Provisional application No. 62/575,285, filed on Oct. 20, 2017, provisional application No. 62/566,048, (Continued)

(51) Int. Cl.
*H04L 5/00*     (2006.01)
*H04L 1/16*     (2006.01)
(Continued)

(52) U.S. Cl.
CPC ......... *H04L 1/1614* (2013.01); *H04B 7/0626* (2013.01); *H04L 5/0048* (2013.01); *H04L 5/0073* (2013.01); *H04W 76/27* (2018.02)

(58) Field of Classification Search
None
See application file for complete search history.

(56) References Cited

U.S. PATENT DOCUMENTS

| 9,596,067 B2 * | 3/2017 | Kim ..................... H04B 7/0626 |
| 2014/0233407 A1 * | 8/2014 | Pourahmadi .......... H04L 5/0094 370/252 |

(Continued)

FOREIGN PATENT DOCUMENTS

| WO | 2015037885 A1 | 3/2015 |
| WO | 2017/048324 A1 | 3/2017 |
| WO | 2018232211 A1 | 12/2018 |

OTHER PUBLICATIONS

Huawei et al., "Discussion on CSI Framework Design", R1-1706926. 3GPP TSG RAN WG1 Meeting #89, Hangzhou, China, May 7, 2017, Sections 1-3.

(Continued)

*Primary Examiner* — Ayanah S George
(74) *Attorney, Agent, or Firm* — Eschweiler & Potashnik, LLC

(57) ABSTRACT

In embodiments, a base station may identify a parameter related to a zero power (ZP) resource element (RE) mapping set in a physical resource block (PRB). The ZP RE mapping set may relate to resources that are not to be used to transmit a physical channel transmission. The base station may then transmit, to a user equipment (UE), an indication of the ZP RE mapping set. Other embodiments may be described and/or claimed.

23 Claims, 14 Drawing Sheets

Related U.S. Application Data filed on Sep. 29, 2017, provisional application No. 62/521,240, filed on Jun. 16, 2017.

(51) Int. Cl.
*H04W 76/27* (2018.01)
*H04B 7/06* (2006.01)

(56) References Cited

U.S. PATENT DOCUMENTS

| | | |
|---|---|---|
| 2015/0365154 A1 | 12/2015 | Davydov et al. |
| 2016/0065350 A1* | 3/2016 | Suzuki .................. H04W 28/18 370/329 |
| 2016/0352455 A1 | 12/2016 | Li et al. |
| 2019/0261380 A1* | 8/2019 | Iyer ...................... H04B 7/0695 |

OTHER PUBLICATIONS

Intel Corporation, "On the need of PDSCH RE mapping and RA enhancements", R1-1707310, 3GPP TSG RAN WG1 Meeting #89, Hangzhou, China, May 7, 2017, pp. 1-2.
International Search Report and Written Opinion in International Patent Application No. PCT/US2018/037709, 12 pages.
ZTE, "Enhancements to control signaling related to PDSCH RE mapping and resource allocation", R1-1707143, 3GPP TSG RAN WG1 Meeting #89, Hangzhou, China, May 7, 2017, pp. 1-4.
Supplementary European Search Report dated Dec. 16, 2020 for European Patent Application 188189179.

* cited by examiner

Identifying a MAC layer transmission that includes an indication of a physical channel RE mapping set, the indication transmitted by a base station
205

Identifying, based on the physical channel RE mapping set, a first parameter and a second parameter related to a physical channel transmission, wherein the first parameter is selected by the base station from a plurality of first parameters, and the second parameter is selected by the base station from a plurality of second parameters
210

Figure 2

RESOURCE ELEMENT (RE) MAPPING IN NEW RADIO (NR)

CROSS-REFERENCE TO RELATED APPLICATION

This application is a national stage application under 35 U.S.C. § 371 of PCT International Application Serial No. PCT/US2018/037709 filed on Jun. 15, 2018 and entitled "RESOURCE ELEMENT (RE) MAPPING IN NEW RADIO (NR)" which application claims the benefit of U.S. Provisional Application No. 62/521,240, filed Jun. 16, 2017, and further claims the benefit of U.S. Provisional Application No. 62/566,048, filed Sep. 29, 2017, and further claims the benefit of U.S. Provisional Application No. 62/575,285, filed Oct. 20, 2017, the subject matter of which is hereby incorporated by reference in their entirety

FIELD

Embodiments of the present disclosure generally relate to the field of cellular communications, and more specifically to resource element (RE) mapping in said cellular communications.

BACKGROUND

The third generation partnership project (3GPP) specifications may support long term evolution (LTE) dynamic indication of physical downlink shared channel (PDSCH) RE mapping in transmission mode 10 (TM10). More specifically, a user equipment (UE) in TM10 may be configured with one of four predefined PDSCH RE mapping sets. Each set may include one or more parameters, which may be configurable by a radio resource control (RRC) entity of a base station. The parameters may include, for example, a number of a cell specific reference signal (CRS) port, a CRS shift, a multicast-broadcast single-frequency network (MBSFN) subframe configuration, a PDSCH starting symbol, a zero power (ZP) channel state information reference signal (CSI-RS) resource identifier (ID) with a subframe configuration, IDs of one or more quasi co-located (QCLed) signals, or some other parameter. For PDSCH scheduling, the eNB may transmit to a UE an indication of which one of the four pre-configured sets should be used for PDSCH decoding.

BRIEF DESCRIPTION OF THE DRAWINGS

FIG. 2 illustrates an example process flow related to identifying a ZP RE mapping set received from a base station, in accordance with various embodiments.

DETAILED DESCRIPTION

Figure 1:
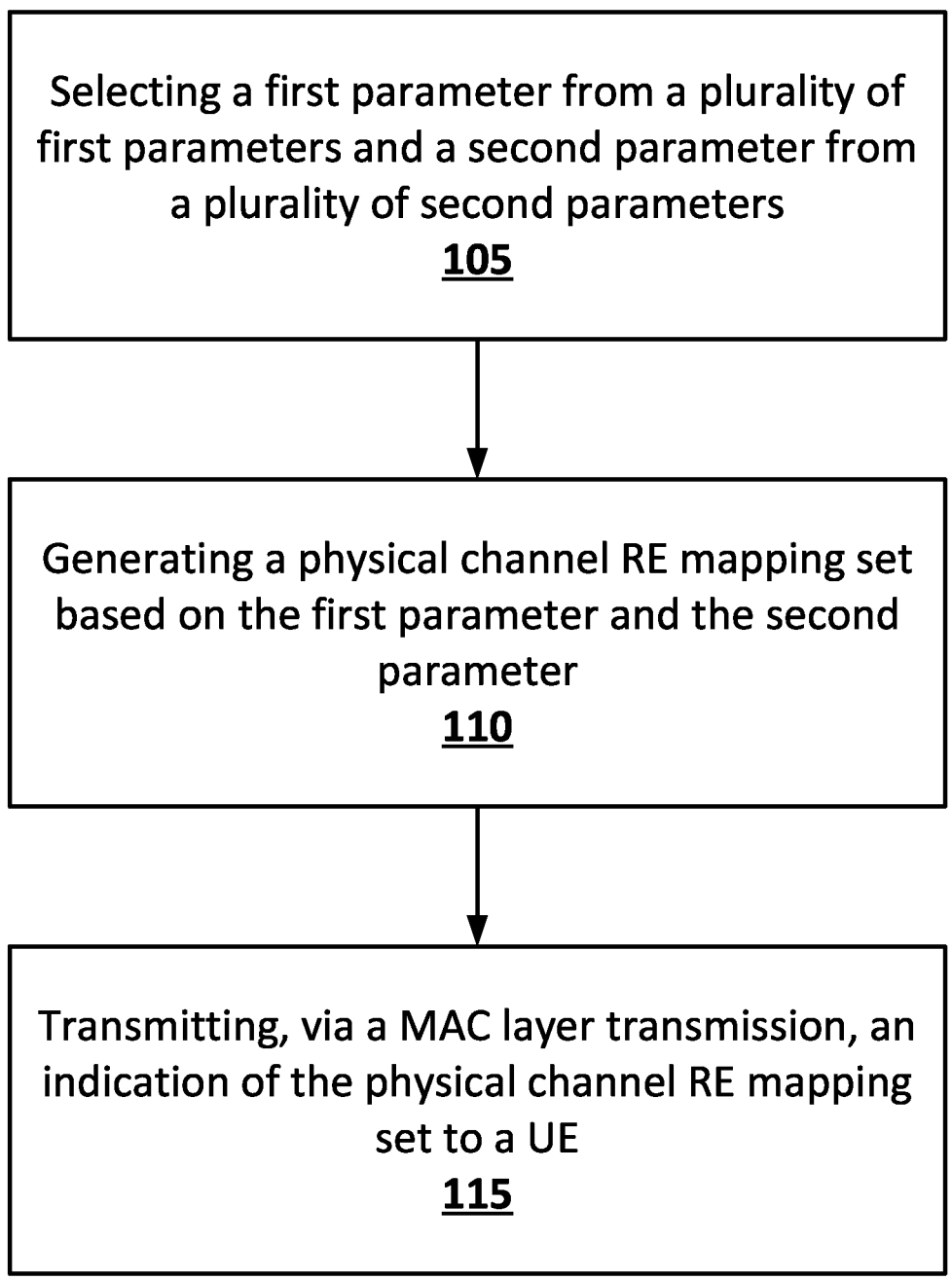
FIG. 1 illustrates an example process flow related to generating and communicating a ZP RE mapping set to a UE, in accordance with various embodiments.

In the following detailed description, reference is made to the accompanying drawings which form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A or B" means (A), (B), or (A and B). For the purposes of the present disclosure, the phrase "A, B, or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or elements are in direct contact.

Various operations may be described as multiple discrete operations in turn, in a manner that is most helpful in understanding the claimed subject matter. However, the order of description should not be construed as to imply that these operations are necessarily order dependent.

As used herein, the term "module" may refer to, be part of, or include an application specific integrated circuit (ASIC), an electronic circuit, a processor (shared, dedicated, or group) or memory (shared, dedicated, or group) that execute one or more software or firmware programs, a combinational logic circuit, or other suitable components that provide the described functionality.

Embodiments herein may be described with respect to various Figures. Unless explicitly stated, the dimensions of the Figures are intended to be simplified illustrative examples, rather than depictions of relative dimensions. For example, various lengths/widths/heights of elements in the Figures may not be drawn to scale unless indicated otherwise.

RE Mapping Set Configuration

Embodiments herein may relate to design of a RE mapping set for new radio (NR) that may be applicable for both downlink (DL) and uplink (UL). More specifically, the RE mapping set may be used for DL transmissions on the PDSCH or UL transmissions on the physical uplink shared channel (PUSCH). The RE mapping set may include one or more of the following described parameters that may be selected by a RRC entity of a base station. The parameters may be selected based on, for example, a desired network characteristic, current network quality of service (QoS), current network load, etc. The RE mapping set may then be generated by the base station and an indication of the RE mapping set may be transmitted to one or more user equipment (UE) for use in identifying PDSCH transmissions or generating PUSCH transmissions.

One parameter may be related to a PDSCH or PUSCH starting symbol, which may indicate the starting position for the PDSCH or PUSCH RE transmission in the time slot.

Another parameter may be related to a PDSCH or PUSCH end symbol which may indicate the duration of the PDSCH or PUSCH transmission within the slot or slots. In other words, the end symbol may indicate the last symbol on which the PDSCH or PUSCH transmission may be transmitted. Additionally or alternatively, the parameter may be related to a number of PDSCH or PUSCH symbols on which the PDSCH or PUSCH transmission will be transmitted.

Another parameter may be related to a ZP CSI-RS ID that may indicate the presence of a ZP CSI-RS resource in a given subframe or slot for one or both of the DL and UL. The indication of the ZP CSI-RS for UL may be used, for example, in a dynamic time division duplexed (TDD) scenario when collision of the PUSCH transmission in one cell with DL transmission in the other cell should be avoided.

Another parameter may relate to a virtual cell identifier (VCID) index that may be used to indicate one value of VCID that. UE may use for demodulation reference signal (DM-RS) modulation for DL or UL transmissions.

Another parameter may relate to an indication of a quasi co-location (QCL) set that may include identities (IDs) of one or more additional or alternative wideband reference signals (RSs) that can be QCL-ed with demodulation reference signals (DM-RS) corresponding to PDSCH.

Another parameter may relate to a waveform index that may be used to indicate to a UE the waveform of a PUSCH transmission. Specifically, the waveform index may indicate whether the PUSCH transmission is to use a cyclic prefix orthogonal frequency division multiplexed (CP-OFDM) waveform, a discrete Fourier transform spread orthogonal frequency division multiplexed (DFT-s-OFDM) waveform, or some other waveform.

Another parameter may relate to a DM-RS pattern that may be used to indicate an assumed DM-RS pattern that the UE should use for demodulation in DL or signal transmission for UL.

In some embodiments, for a DL transmission with a plurality of multiple input multiple output (MIMO) layers, downlink control information (DCI) may include additional information related to the configuration of DM-RS antenna ports into DM-RS antenna port groups. For example, in some embodiments if four or less MIMO layers are used, it may be useful to include the additional information in the DCI. In other embodiments, the additional information may be desirable for a different number of MIMO layers.

As an example, DM-RS antenna ports A, B, C, and D may be scheduled for a PDSCH transmission. A pre-determined DM-RS antenna port grouping rule may be defined, and may indicate the DM-RS antenna port grouping based on a total number of MIMO layers. Table 1 depicts an example of such as DM-RS antenna port grouping rule, below.

TABLE 1

| Number of MIMO layers | DM-RS antenna ports in each group |
|---|---|
| 2 | $1^{st}$ group {A} |
|   | $2^{nd}$ group {B} |
| 3 | $1^{st}$ group {A} |
|   | $2^{nd}$ group {B, C} |
| 4 | $1^{st}$ group {A, B} |
|   | $2^{nd}$ group {C, D} |

For the first and second DM-RS antenna port group, radio resource control (RRC) signaling in the PDSCH RE mapping set may configure one, two, or some other number of IDs of a wideband reference signal that may be suitable for fine time or frequency tracking, for example by using QCL signaling. Such a wideband reference signal may include, for example, the CSI-RS or some other reference signal. Respective IDs of the reference signal may correspond to first and second DM-RS antenna port groups. The configuration of QCL sets may also support configuration of a single reference signal ID that may be applicable to both DM-RS antenna port groups. This single reference signal ID may be used to support fallback mode operation to a single transmission/reception point (TRP) where all MIMO layers and corresponding DM-RS antenna ports are transmitted from the same TRP and, therefore, QCL-ed with each other. As used herein, TRP may refer to a point able of both transmission and reception (i.e., UL and DL) communication with a UE or some other device. In embodiments, the TRP may also be referred to as a base station, a NodeB, and enhanced NodeB, a fifth generation (5G) or new radio (NR) NodeB, etc.

For the PDSCH scheduling, the TRP may indicate to the UE one of the QCL parameter sets in DCI corresponding to the scheduling decision. The example of the QCL sets configuration for the case of two coordinating TRPs transmitting reference signals with ID1 and ID2 may be as shown in the Table 2, below.

TABLE 2

| PDSCH RE mapping set | QCL set |
|---|---|
| 1 | $ID_1$ |
| 2 | $ID_2$ |
| 3 | $ID_1, ID_2$ |
| 4 | $ID_2, ID_1$ |

In some embodiments, the size of the set of PDSCH RE mapping parameters may be configurable. For example, the base station may configure the UE with the set of PDSCH RE mapping parameters by using RRC signaling. The UE may be configured with, for example 8 sets of PDSCH RE mapping parameters, or some other number of sets.

In some embodiments, medium access control (MAC) control element (CE) signaling may be used to down select from a larger set of RRC configurable RE mapping set combinations for a PDSCH or PUSCH transmission to a subset of possible combinations. For example, the base station may transmit a MAC CE with an indication to the UE that the UE is to down select from a larger set of RE mapping sets to, for example, four RE mapping sets. Other embodiments may down select to a different number of sets.

In some embodiments, DCI bits, for example 2 bits transmitted in the base station's DCI transmission, may be used to indicate to the UE the actual RE mapping set for a scheduled PDSCH or PUSCH transmission. The actual RE mapping set may be selected from, for example, the subset of PDSCH/PUSCH RE mapping set combinations indicated by the MAC CE signaling, described above.

In the absence of an indication of a RE mapping set for a PDSCH or a PUSCH transmission, the UE may use a pre-defined RE mapping set. The pre-defined RE mapping set may be, for example, pre-configured in the UE or indicated to the UE upon connection to a base station. An example of such a default mapping set may include one or more of the following:

- The starting symbol for a PDSCH transmission may be $L=3$.
- The starting symbol for a PUSCH transmission may be $L=0$.
- The end symbol or the number of symbols of a PDSCH transmission or a PUSCH transmission may be based on a duration of the DL or UL slot in which the PDSCH or PUSCH transmissions may occur.
- Only a ZP CSI-RS with a subframe configuration may be present for the DL slot.
- The VCID may be equal to a primary cell identifier (PCID) or a PCID combined with a synchronization signal (SS) block for both UL and DL DM-RS modulation.
- The QCL of the DM-RS antenna port may be based on the antenna port of the detected SS block of the serving cell.
- The PDSCH transmission may use a CP-OFDM waveform.
- The PUSCH transmission may use a CP-OFDM waveform or a DFT-s-OFDM waveform.
- The DM-RS pattern may correspond to a DM-RS pattern of the first type.

FIG. 1 depicts an example technique by which a base station may generate and transmit an indication of a RE mapping set as described above. Specifically, the technique may include selecting, by a base station at 105, a first parameter from a plurality of first parameters and a second parameter from a plurality of second parameters. The first and second parameters may be, for example, values of one or more of the parameters discussed above such as the PDSCH/PUSCH starting symbol, PDSCH/PUSCH end symbol, number of PDSCH/PUSCH symbols, ZP CSI-RS ID, VCID index, QCL sets, waveform index, some other parameter, etc.

The process may further include generating, by the base station at 110, a physical channel RE mapping set based on the first parameter and the second parameter. The process may further include transmitting, at 115 via a MAC layer transmission, an indication of the physical channel RE mapping set to a UE. For example, as noted above in some embodiments a MAC layer transmission may be used to down select from a larger number of possible RE mapping sets to a subset of those RE mapping sets. For example, the RE mapping set generated at 110, and a plurality of other RE mapping sets, may be indicated to the UE via RRC layer signaling. A MAC layer transmission such as a MAC CE may then be used to indicate a subset of the RE mapping sets A final signal such as a DCI signal or some other signal may be used to indicate the "actual" RE mapping set as discussed above.

FIG. 2 depicts a corresponding technique by which a UE may identify and use a RE mapping set received from a base station. The technique may include identifying, by the UE at 205, a MAC layer transmission that includes an indication of a physical channel RE mapping set. The MAC layer transmission may be, for example the MAC CE described above with respect to 115 or elsewhere.

The technique may further include, by the UE at 210 based on the physical channel RE mapping set, a first parameter and a second parameter related to a physical channel transmission, wherein the first parameter is selected by the base station from a plurality of first parameters, and the second parameter is selected by the base station from a plurality of second parameters. The first parameter and the second parameter may be, for example, one of the parameters described above with respect to 105 or elsewhere.

RE Mapping Set Communication

In some embodiments, one or more ZP resources may be configured for the UE using RRC signaling, as discussed above. That is, the RRC entity of the base station may identify the one or more resources. The UE may then be notified of the ZP resource in a slot configuration transmission or DCI for PDSCH or PUSCH REs. The ZP resource may be configured by the ZP unit type and a bitmap that indicates which units are active. In some embodiments, ZP units may overlap with reference signals (e.g. non-zero power (NZP) CSI-RS, DM-RS, etc.), PUSCH, or PDSCH resources. Generally, embodiments herein may provide the advantage of allowing more flexible RE mapping for PDSCH or PUSCH transmissions.

More generally, embodiments herein may relate to PDSCH or PUSCH RE mapping sets for DL and UL, respectively. The RE mapping sets may include sets of ZP RE units. The ZP RE units may be, for example, some combination of resources such as 2×1, 2×2, 1×2, 1×1, etc. The ZP RE units may be indicated to the UE using a bitmap, and each bit in the bitmap may correspond to a ZP RE unit. In embodiments, the ZP RE units in the physical resource block of a slot may be ordered within the bitmap. For example, in some embodiments the ZP RE units may be ordered in frequency first, and then time. In other embodiments the ZP RE units may be ordered in time first, and then frequency.

Generally, the RE mapping sets may indicate REs in a slot in which the base station may transmit a PDSCH transmission, or in which a UE may transmit a PUSCH transmission. The ZP REs in the slot may be REs on which the PDSCH transmission or the PUSCH transmission is not transmitted. Therefore, by efficiently communicating the ZP REs, the base station may be able to provide a subset of REs in the slot on which the PUSCH or PDSCH transmissions may not be communicated.

Figure 3:
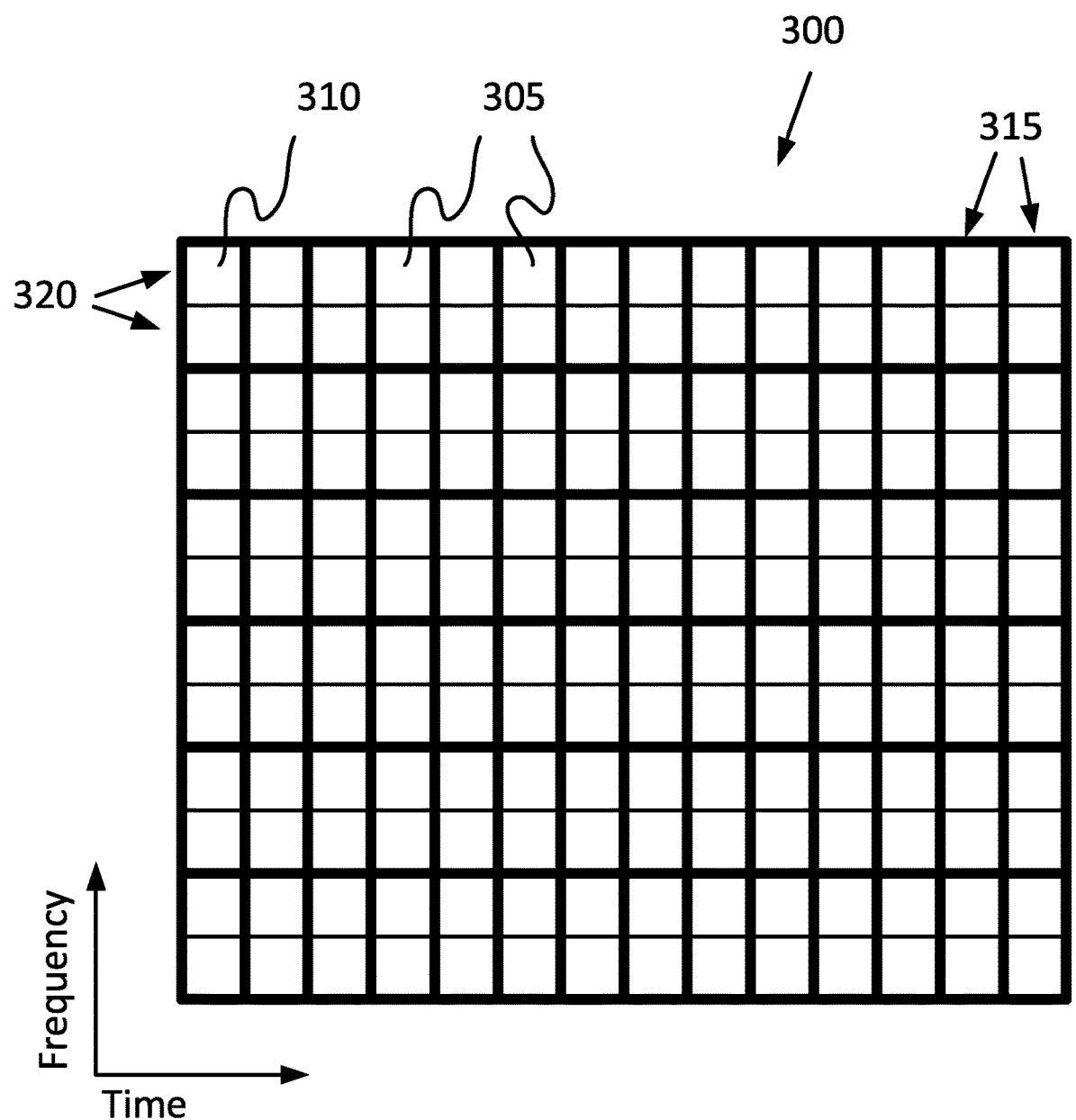
FIG. 3 illustrates an example process flow related to generating and communicating a RE mapping set to a UE, in accordance with various embodiments.

FIG. 3 illustrates one example ZP RE mapping set 300. Specifically, FIG. 3 depicts a physical resource block (PRB) with a plurality of ZP REs 305. The PRB may by visually represented by a plurality of columns of OFDM symbols 315 in time, and a plurality of rows of subcarriers 320 in frequency.

As shown in FIG. 3, the ZP REs 305 may be subdivided into a plurality of units 310. Here, the units 310 are 2×1, that is, two subcarriers by one OFDM symbol. As shown in FIG. 3, the ZP RE mapping set 300 may therefore include 6 units 310 in the frequency domain and 14 in the time domain.

Figure 4:
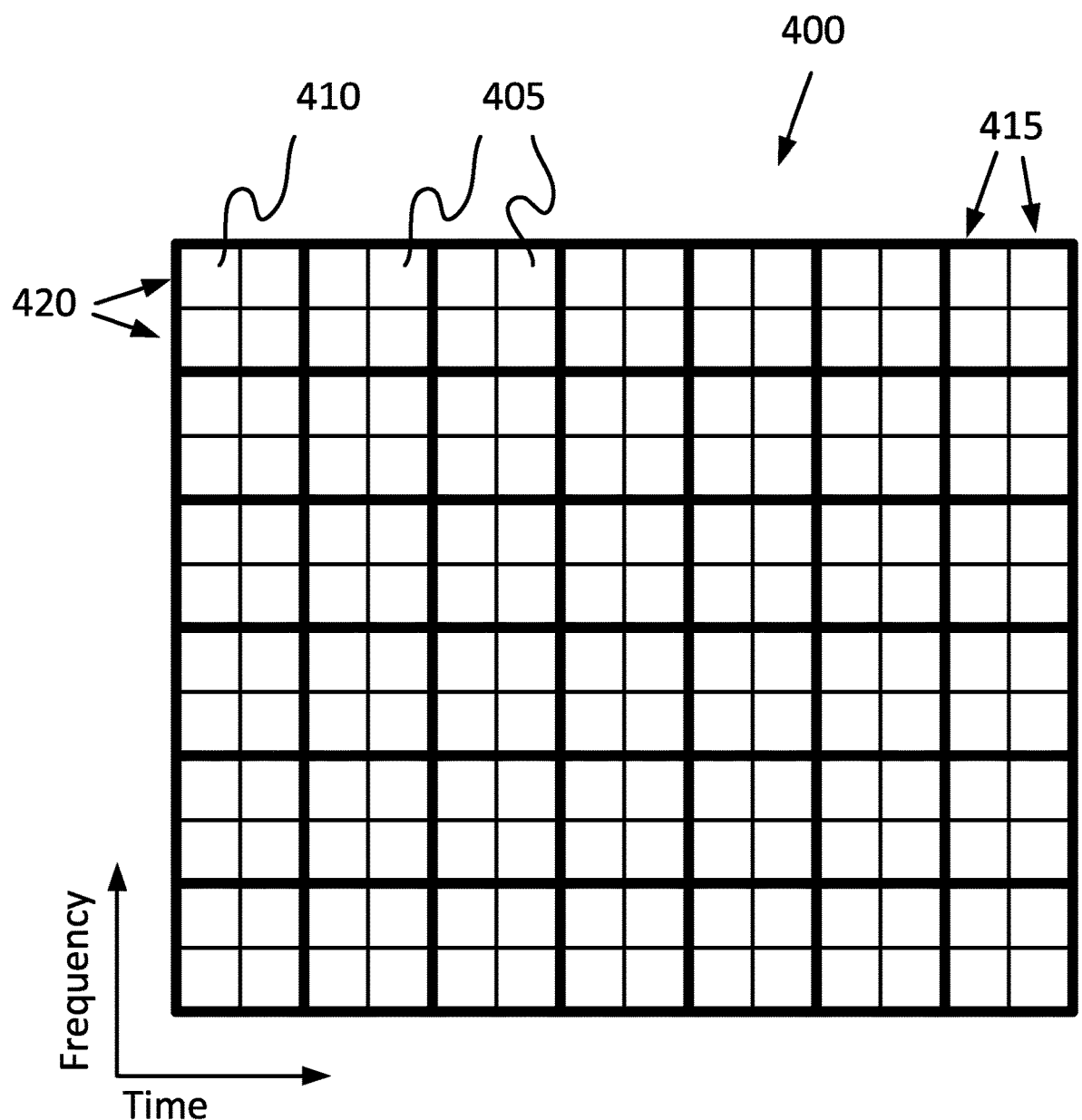
FIG. 4 illustrates an example process flow related to identifying a RE mapping set received from a base station, in accordance with various embodiments.

FIG. 4 illustrates an alternative example ZP RE mapping set 400. The ZP RE mapping set 400 may include REs 405, columns of OFDM symbols 415, and rows of OFDM subcarriers 420, which may be respectively similar to REs 305, columns of OFDM symbols 315, and rows of subcarriers 320.

The ZP RE mapping set 400 may also include units 410, but in FIG. 4 the units 410 may be 2×2. That is, the units 410 may be made up of two subcarriers in the frequency domain and 2 OFDM symbols in the time domain. In FIG. 4, the ZP RE mapping set may therefore include 6 units 410 in the frequency domain and 7 units 410 in the time domain.

It will be understood that FIGS. 3 and 4 are intended to illustrate various examples, however other embodiments may use different ZP RE mapping sets. For example, in other embodiments the size of the units may be different, a different number of subcarriers may be used in the ZP RE mapping set, or a different number of OFDM symbols may be used.

Generally, configuration of the ZP RE mapping set or the PDSCH or PUSCH may use one or more of the following parameters:

Identification, by the base station, of the type/size of the ZP RE units (such as units 310 or 410). For example, the configuration may include identification of whether the units are 1×2, 2×1, 2×2, 1×1, etc.

Identification, by the base station, of a bitmap of the ZP RE units (such as 310 or 410), as described above. Specifically, as noted the bitmap may correspond to one ZP RE unit, and may be ordered frequency first or time first.

Identification, by the base station, of an allocation of the PRBs in which the ZP REs will be transmitted. In embodiments, an indication of the PRBs may be transmitted to a UE via a bitmap or some other signaling. The indication may indicate which PRBs or set of PRBs with granularity of L PRBs in the frequency domain are used for the ZP RE mapping set.

Identification, by the base station, of a slot configuration of the slot in which the ZP REs will be transmitted. In embodiments, the slot configuration for the ZP RE mapping set may include a joint configuration of a slot offset and a slot periodicity. Specifically, the slot offset may refer to slot index relative to the first slot index in radio frame. The slot periodicity may refer to periodicity of ZP RE set transmission in the units of slot. In some embodiments, the minimum slot periodicity supported by the ZP RE mapping set may be 1 slot. The example of the ZP RE mapping set slot configuration is illustrated in Table 3, below. For example, if the ZP RE mapping set slot configuration is set to 6, the periodicity of the ZP RE mapping set may be 5 slots, and the slot offset may be 1 relative to the start of the radio frame.

TABLE 3

| ZP RE mapping set slot configuration (l) | ZP RE mapping set periodicity (in slots) | ZP RE mapping set resource offset (in slots) |
| --- | --- | --- |
| 0 | 1 | 0 |
| 1-5 | 5 | 1 - 1 |
| 6-15 | 10 | 1 - 6 |
| 16-35 | 20 | 1 - 16 |

TABLE 3-continued

| ZP RE mapping set slot configuration (l) | ZP RE mapping set periodicity (in slots) | ZP RE mapping set resource offset (in slots) |
| --- | --- | --- |
| 36-75 | 40 | 1 - 36 |
| 76-155 | 80 | 1 - 76 |

In embodiments, an indication of the ZP RE mapping set, for example the bitmap discussed above or an indication of one or more of the other parameters discussed above, may be dynamically transmitted to the UE via DCI. Specifically, the DCI may be to schedule a PDSCH or PUSCH transmission, and include an indication to the UE of one set of the ZP RE mapping set in a given slot. Alternatively, the indication may be transmitted to the UE in a semi-static manner, wherein the slots where the ZP RE mapping set is present is configured by the ZP RE mapping set slot configuration described above.

In some embodiments, if the ZP REs of the ZP RE mapping set present a resource collision with other reference signals in the cell, the UE should assume that the reference signal is present. For example, if one or more fate ZP REs of the ZP RE mapping set is to collide with a reference signal such as a CSI-RS, a DM-RS, a tracking reference signal (TRS), a phase tracking reference signal (PT-RS), or some other reference signal, then the UE should assume that the ZP RE is dropped and the reference signal is present in the overlapping resource elements. In other embodiments, in the case of collision the UE may assume that the ZP RE is present, and the reference signal is dropped.

In some embodiments, it may be undesirable for the PDSCH or PUSCH transmission to be mapped in the current slot indicated by the ZP RE mapping set. More specifically, if the UE identifies an indication of the ZP RE mapping set, for example via a bitmap received in DCI, then the UE may not apply that mapping set to the current slot in which the bitmap is received.

In one embodiment, the bitmap of the ZP RE mapping set may include two separate bitmaps. The first bitmap may have a length of 6, and relate to the frequency domain. Each bit in the first bitmap may correspond to two frequency adjacent ZP REs in the PRB. The second bitmap may have a length of 14, and relate to the time domain. Each bit in the second bitmap may correspond to an OFDM symbol in the PRB. The ZP CSI-RS configuration for PRBs in this case may be a Kronecker product of two vectors, each corresponding to a different bitmap. It will be understood, however, that this description is intended as one embodiment and other embodiments may have bitmaps of different lengths, or an increased (or decreased) number of bitmaps. Alternatively, each bit in the first bitmap may correspond to more or less ZP REs in the PRB. Alternatively, each bit in the second bitmap may correspond to an increased number of OFDM symbols.

In some embodiments, an interference measurement resource may be configured with a periodicity of 1 slot. The interference measurement resource may relate to set RE or subcarriers and OFDM symbol were UE is configured to perform interference measurements for Channel State Information (CSI) reports.

Figure 5:
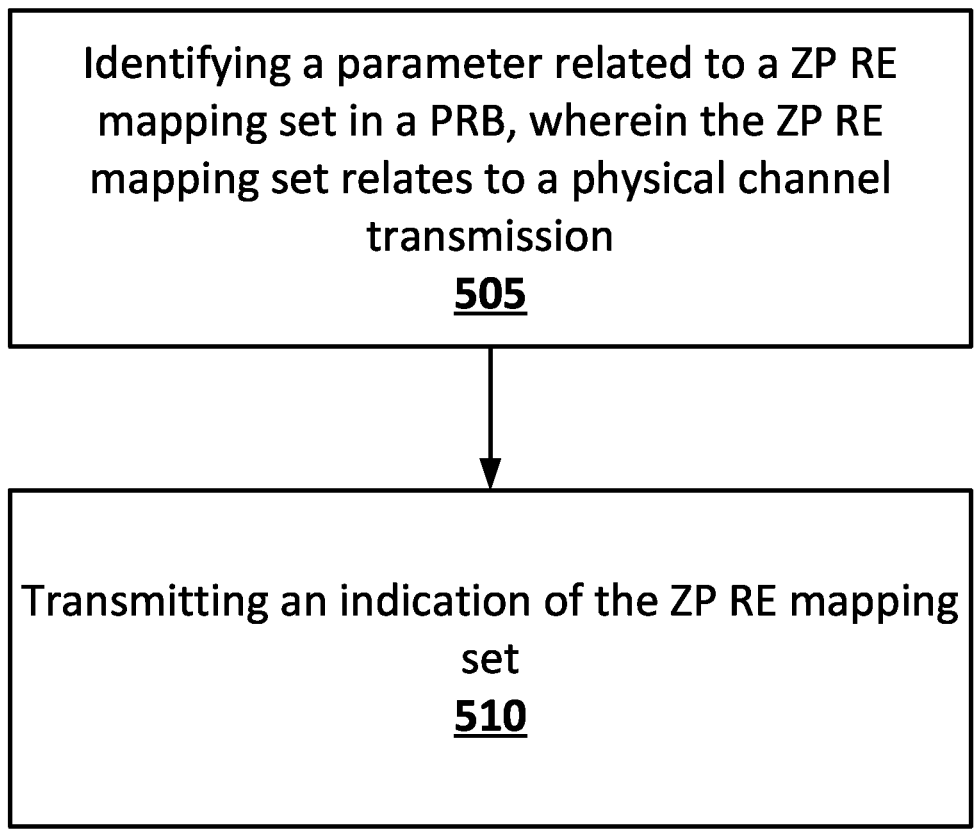
FIG. 5 illustrates an example RE mapping set, in accordance with various embodiments.

FIG. 5 illustrates an example process flow related to generating and communicating a ZP RE mapping set to a UE, in accordance with various embodiments. Specifically, the process flow may relate to generating a ZP RE mapping set such as that shown in FIG. 3 or 4, or some other ZP RE mapping set. The process flow may include identifying, by a base station at 505, a parameter related to a ZP RE mapping set in a PRB, wherein the ZP RE mapping set relates to a physical channel transmission. In some embodiments, the physical channel transmission may be a PUSCH transmission or a PDSCH transmission. In some embodiments, the parameter may be related to a number of PRBs allocated for transmission of the ZP RE mapping set, a slot configuration for the transmission of the ZP RE mapping set, a slot offset of the ZP RE mapping set, a slot periodicity of the ZP RE mapping set, or some other parameter. In embodiments, the parameter may relate to a ZP RE mapping set within a specific slot, and so the parameter may be said to have a slot-level granularity. The parameter may be, for example, identified by an RRC entity of the base station.

The process flow may further include transmitting, by a base station at 510, an indication of the ZP RE mapping set. In embodiments the indication may be, for example, a identity of the ZP RE mapping set. The identity may be transmitted, for example, in DCI or a slot configuration indication.

Figure 6:
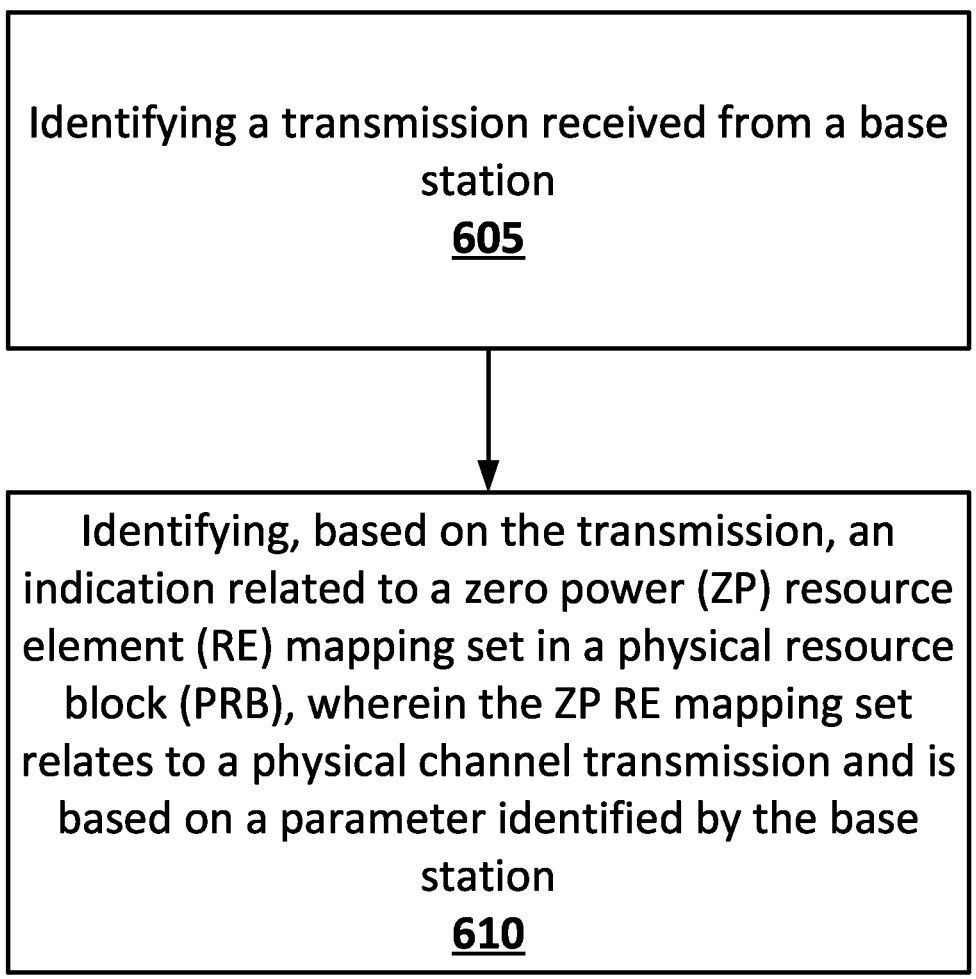
FIG. 6 illustrates an alternative example RE mapping set, in accordance with various embodiments.

FIG. 6 illustrates an example process flow related to identifying a ZP RE mapping set received from a base station, in accordance with various embodiments. In embodiments, the process flow may include identifying, by a UE, a transmission received from a base station at 605. The transmission may be, for example, received via DCI, a slot configuration, or some other transmission.

The process flow may further include identifying, by the UE at 610 based on the received transmission, an indication related to a ZP RE mapping set in a PRB, wherein the ZP RE mapping set relates to a physical channel transmission and is based on a parameter identified by the base station. The physical channel transmission may be, for example, a PUSCH or a PDSCH transmission. In some embodiments, the parameter may be similar to the parameter discussed above with respect to element 505 of FIG. 5. The indication may be, for example, a bitmap as described above with respect to FIGS. 3 and 4.

Figure 7:
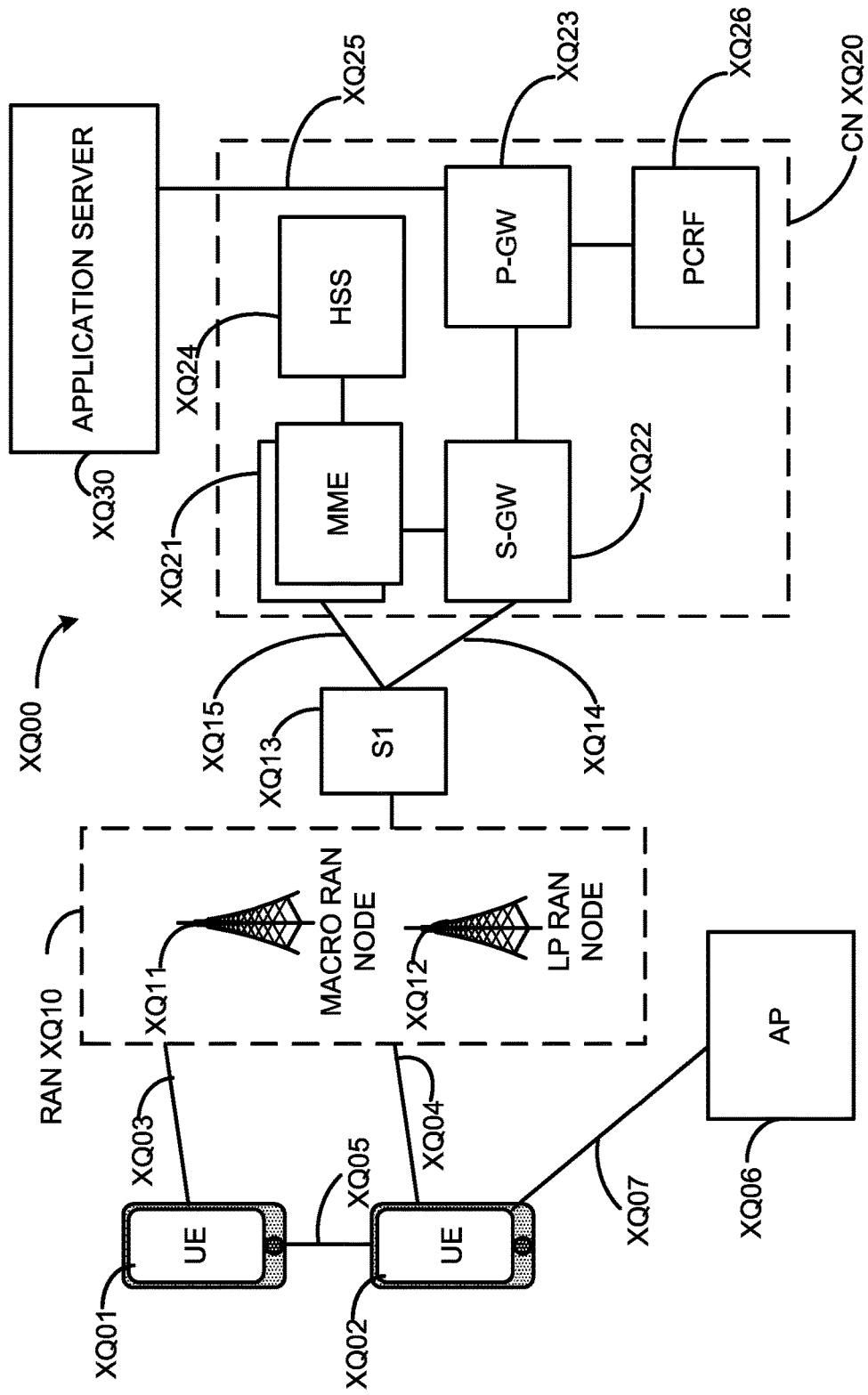
FIG. 7 illustrates an example architecture of a system of a network, in accordance with various embodiments.

FIG. 7 illustrates an architecture of a system XQ00 of a network in accordance with some embodiments. The system XQ00 is shown to include a user equipment (UE) XQ01 and a UE XQ02. As used herein, the term "user equipment" or "UE" may refer to a device with radio communication capabilities and may describe a remote user of network resources in a communications network. The term "user equipment" or "UE" may be considered synonymous to, and may be referred to as client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface. In this example, UEs XQ01 and XQ02 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, machine-type communications (MTC) devices, machine-to-machine (M2M), Internet of Things (IoT) devices, and/or the like.

In some embodiments, any of the UEs XQ01 and XQ02 can comprise an Internet of Things (IoT) UE, which can comprise a network access layer designed for low power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs XQ01 and XQ02 may be configured to connect, e.g., communicatively couple, with a radio access network (RAN) XQ10. The RAN XQ10 may be, for example, an Evolved Universal Mobile Telecommunications System (UMTS) Terrestrial Radio Access Network (E-UTRAN), a NextGen RAN (NG RAN), or some other type of RAN. The UEs XQ01 and XQ02 utilize connections (or channels) XQ03 and XQ04, respectively, each of which comprises a physical communications interface or layer (discussed in further detail infra). As used herein, the term "channel" may refer to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" may refer to a connection between two devices through a Radio Access Technology (RAT) for the purpose of transmitting and receiving information. In this example, the connections XQ03 and XQ04 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs XQ01 and XQ02 may further directly exchange communication data via a ProSe interface XQ05. The ProSe interface XQ05 may alternatively be referred to as a sidelink (SL) interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH). In various implementations, the SL interface XQ05 may be used in vehicular applications and communications technologies, which are often referred to as V2X systems. V2X is a mode of communication where UEs (for example, UEs XQ01, XQ02) communicate with each other directly over the PC5/SL interface XQ05 and can take place when the UEs XQ01, XQ02 are served by RAN nodes XQ11, XQ12 or when one or more UEs are outside a coverage area of the RAN XQ10. V2X may be classified into four different types: vehicle-to-vehicle (V2V), vehicle-to-infrastructure (V21), vehicle-to-network (V2N), and vehicle-to-pedestrian (V2P). These V2X applications can use "cooperative awareness" to provide more intelligent services for end-users. For example, vehicle UEs (vUEs) XQ01, XQ02, RAN nodes XQ11, XQ12, application servers XQ30, and pedestrian UEs XQ01, XQ02 may collect knowledge of their local environment (for example, information received from other vehicles or sensor equipment in proximity) to process and share that knowledge in order to provide more intelligent services, such as cooperative collision warning, autonomous driving, and the like. In these implementations, the UEs XQ01, XQ02 may be implemented/employed as Vehicle Embedded Communications Systems (VECS) or vUEs.

The UE XQ02 is shown to be configured to access an access point (AP) XQ06 (also referred to as "WLAN node XQ06", "WLAN XQ06", "WLAN Termination XQ06" or "WT XQ06" or the like) via connection XQ07. The connection XQ07 can comprise a local wireless connection, such as a connection consistent with any IEEE 802.11 protocol, wherein the AP XQ06 would comprise a wireless fidelity (WiFi®) router. In this example, the AP XQ06 is shown to be connected to the Internet without connecting to the core network of the wireless system (described in further detail below). In various embodiments, the UE XQ02, RAN XQ10, and AP XQ06 may be configured to utilize LTE-WLAN aggregation (LWA) operation and/or WLAN LTE/WLAN Radio Level Integration with IPsec Tunnel (LWIP) operation. The LWA operation may involve the UE XQ02 in RRC CONNECTED being configured by a RAN node XQ11, XQ12 to utilize radio resources of LTE and WLAN. LWIP operation may involve the UE XQ02 using WLAN radio resources (e.g., connection XQ07) via Internet Protocol Security (IPsec) protocol tunneling to authenticate and encrypt packets (e.g., internet protocol (IP) packets) sent over the connection XQ07. IPsec tunneling may include encapsulating entirety of original IP packets and adding a new packet header, thereby protecting the original header of the IP packets.

The RAN XQ10 can include one or more access nodes that enable the connections XQ03 and XQ04. As used herein, the terms "access node," "access point," or the like may describe equipment that provides the radio baseband functions for data and/or voice connectivity between a network and one or more users. As described above, these access nodes can be referred to as base stations (BS), NodeBs, evolved NodeBs (eNBs), next Generation NodeBs (gNB), RAN nodes, Road Side Units (RSUs), and so forth, and can comprise ground stations (e.g., terrestrial access points) or satellite stations providing coverage within a geographic area (e.g., a cell). The term "Road Side Unit" or "RSU" may refer to any transportation infrastructure entity implemented in or by a gNB/eNB/RAN node or a stationary (or relatively stationary) UE, where an RSU implemented in or by a UE may be referred to as a "UE-type RSU", an RSU implemented in or by an eNB may be referred to as an "eNB-type RSU." The RAN XQ10 may include one or more RAN nodes for providing macrocells, e.g., macro RAN node XQ11, and one or more RAN nodes for providing femtocells or picocells (e.g., cells having smaller coverage areas, smaller user capacity, or higher bandwidth compared to macrocells), e.g., low power (LP) RAN node XQ12.

Any of the RAN nodes XQ11 and XQ12 can terminate the air interface protocol and can be the first point of contact for the UEs XQ01 and XQ02. In some embodiments, any of the RAN nodes XQ11 and XQ12 can fulfill various logical functions for the RAN XQ10 including, but not limited to, radio network controller (RNC) functions such as radio bearer management, uplink and downlink dynamic radio resource management and data packet scheduling, and mobility management.

In accordance with some embodiments, the UEs XQ01 and XQ02 can be configured to communicate using Orthogonal Frequency Division Multiplexing (OFDM) communication signals with each other or with any of the RAN nodes XQ11 and XQ12 over a multicarrier communication channel in accordance with various communication techniques, such as, but not limited to, an Orthogonal Frequency Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes XQ11 and XQ12 to the UEs XQ01 and XQ02, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UEs XQ01, XQ02 and the RAN nodes XQ11, XQ12 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UEs XQ01, XQ02 and the RAN nodes XQ11, XQ12 may operate using Licensed Assisted Access (LAA), enhanced LAA (eLAA), and/or further eLAA (feLAA) mechanisms. In these implementations, the UEs XQ01, XQ02 and the RAN nodes XQ11, XQ12 may perform one or more known medium sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UEs XQ01, XQ02, RAN nodes XQ11, XQ12, etc.) senses a medium (for example, a channel or carrier frequency) and transmits when the medium is sensed to be idle (or when a specific channel in the medium is sensed to be unoccupied). The medium sensing operation may include clear channel assessment (CCA), which utilizes at least energy detection (ED) to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing radiofrequency (RF) energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called carrier sense multiple access with collision avoidance (CSMA/CA). Here, when a WLAN node (e.g., a mobile station (MS) such as UE XQ01 or XQ02, AP 106, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the contention window size (CWS), which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y extended CCA (ECCA) slots, where X and Y are minimum and maximum values for the CWSs for LAA. In one example, the minimum CWS for an LAA transmission may be 9 microseconds (µs); however, the size of the CWS and a maximum channel occupancy time (MCOT) (for example, a transmission burst) may be based on governmental regulatory requirements.

The LAA mechanisms are built upon carrier aggregation (CA) technologies of LTE-Advanced systems. In CA, each aggregated carrier is referred to as a component carrier (CC). A CC may have a bandwidth of 1.4, 3, 5, 10, 15 or 20 MHz and a maximum of five CCs can be aggregated, and therefore, a maximum aggregated bandwidth is 100 MHz. In Frequency Division Duplexing (FDD) systems, the number of aggregated carriers can be different for DL and UL, where the number of UL CCs is equal to or lower than the number of DL component carriers. In some cases, individual CCs can have a different bandwidth than other CCs. In Time Division Duplexing (TDD) systems, the number of CCs as well as the bandwidths of each CC is usually the same for DL and UL.

CA also comprises individual serving cells to provide individual CCs. The coverage of the serving cells may differ, for example, due to that CCs on different frequency bands will experience different pathloss. A primary service cell or primary cell (PCell) may provide a Primary CC (PCC) for both UL and DL, and may handle Radio Resource Control (RRC) and Non-Access Stratum (NAS) related activities. The other serving cells are referred to as secondary cells (SCells), and each SCell may provide an individual Secondary CC (SCC) for both UL and DL. The SCCs may be added and removed as required, while changing the PCC may require the UE XQ01, XQ02 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different Physical Uplink Shared Channel (PUSCH) starting positions within a same subframe.

The physical downlink shared channel (PDSCH) may carry user data and higher-layer signaling to the UEs XQ01 and XQ02. The physical downlink control channel (PDCCH) may carry information about the transport format and resource allocations related to the PDSCH channel, among other things. It may also inform the UEs XQ01 and XQ02 about the transport format, resource allocation, and H-ARQ (Hybrid Automatic Repeat Request) information related to the uplink shared channel. Typically, downlink scheduling (assigning control and shared channel resource blocks to the UE XQ02 within a cell) may be performed at any of the RAN nodes XQ11 and XQ12 based on channel quality information fed back from any of the UEs XQ01 and XQ02. The downlink resource assignment information may be sent on the PDCCH used for (e.g., assigned to) each of the UEs XQ01 and XQ02.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced control channel elements (ECCEs). Similar to above, each ECCE may correspond to nine sets of four physical resource elements known as an enhanced resource element groups (EREGs). An ECCE may have other numbers of EREGs in some situations.

The RAN XQ10 is shown to be communicatively coupled to a core network (CN) XQ20 via an S1 interface XQ13. In embodiments, the CN XQ20 may be an evolved packet core (EPC) network, a NextGen Packet Core (NPC) network, or some other type of CN. In this embodiment the S1 interface XQ13 is split into two parts: the S1-U interface XQ14, which carries traffic data between the RAN nodes XQ11 and XQ12 and the serving gateway (S-GW) XQ22, and the S1-mobility management entity (MME) interface XQ15, which is a signaling interface between the RAN nodes XQ11 and XQ12 and MMES XQ21.

In this embodiment, the CN XQ20 comprises the MMES XQ21, the S-GW XQ22, the Packet Data Network (PDN)

Gateway (P-GW) XQ23, and a home subscriber server (HSS) XQ24. The MMES XQ21 may be similar in function to the control plane of legacy Serving General Packet Radio Service (GPRS) Support Nodes (SGSN). The MMES XQ21 may manage mobility aspects in access such as gateway selection and tracking area list management. The HSS XQ24 may comprise a database for network users, including subscription-related information to support the network entities' handling of communication sessions. The CN XQ20 may comprise one or several HSSs XQ24, depending on the number of mobile subscribers, on the capacity of the equipment, on the organization of the network, etc. For example, the HSS XQ24 can provide support for routing/roaming, authentication, authorization, naming/addressing resolution, location dependencies, etc.

The S-GW XQ22 may terminate the S1 interface XQ13 towards the RAN XQ10, and routes data packets between the RAN XQ10 and the CN XQ20. In addition, the S-GW XQ22 may be a local mobility anchor point for inter-RAN node handovers and also may provide an anchor for inter-3GPP mobility. Other responsibilities may include lawful intercept, charging, and some policy enforcement.

The P-GW XQ23 may terminate an SGi interface towards a PDN. The P-GW XQ23 may route data packets between the EPC network XQ20 and external networks such as a network including the application server XQ30 (alternatively referred to as application function (AF)) via an Internet Protocol (IP) interface XQ25. Generally, the application server XQ30 may be an element offering applications that use IP bearer resources with the core network (e.g., UMTS Packet Services (PS) domain, LTE PS data services, etc.). In this embodiment, the P-GW XQ23 is shown to be communicatively coupled to an application server XQ30 via an IP communications interface XQ25. The application server XQ30 can also be configured to support one or more communication services (e.g., Voice-over-Internet Protocol (VoIP) sessions, PTT sessions, group communication sessions, social networking services, etc.) for the UEs XQ01 and XQ02 via the CN XQ20.

The P-GW XQ23 may further be a node for policy enforcement and charging data collection. Policy and Charging Rules Function (PCRF) XQ26 is the policy and charging control element of the CN XQ20. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF XQ26 may be communicatively coupled to the application server XQ30 via the P-GW XQ23. The application server XQ30 may signal the PCRF XQ26 to indicate a new service flow and select the appropriate Quality of Service (QoS) and charging parameters. The PCRF XQ26 may provision this rule into a Policy and Charging Enforcement Function (PCEF) (not shown) with the appropriate traffic flow template (TFT) and QoS class of identifier (QCI), which commences the QoS and charging as specified by the application server XQ30.

Figure 8:
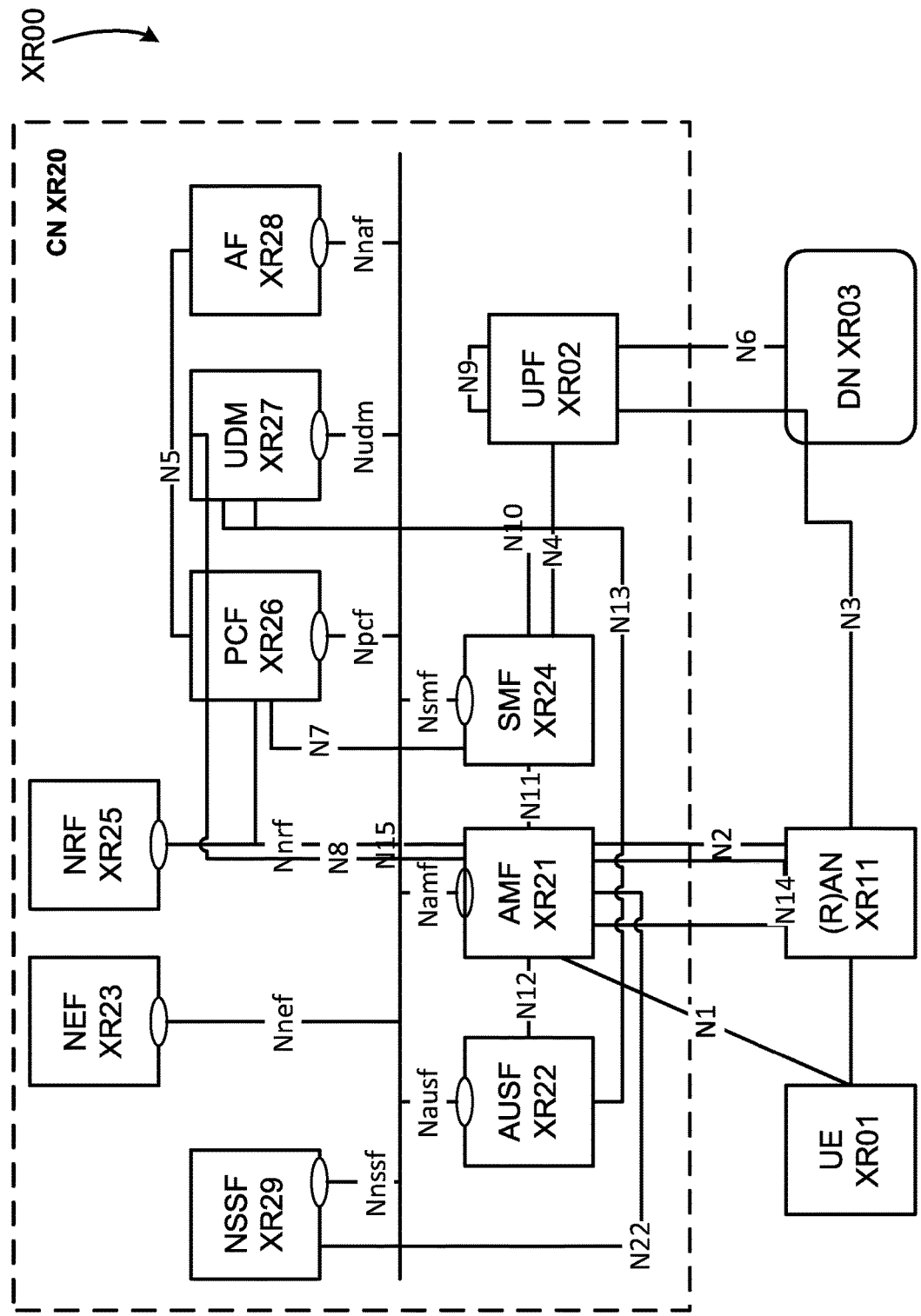
FIG. 8 illustrates an alternative example architecture of a system of a network, in accordance with various embodiments.

FIG. 8 illustrates an architecture of a system XR00 of a network in accordance with some embodiments. The system XR00 is shown to include a UE XR01, which may be the same or similar to UEs XQ01 and XQ02 discussed previously; a RAN node XR11, which may be the same or similar to RAN nodes XQ11 and XQ12 discussed previously; a Data Network (DN) XR03, which may be, for example, operator services, Internet access or 3rd party services; and a 5G Core Network (5GC or CN) XR20.

The CN XR20 may include an Authentication Server Function (AUSF) XR22; an Access and Mobility Management Function (AMF) XR21; a Session Management Function (SMF) XR24; a Network Exposure Function (NEF) XR23; a Policy Control Function (PCF) XR26; a Network Function (NF) Repository Function (NRF) XR25; a Unified Data Management (UDM) XR27; an Application Function (AF) XR28; a User Plane Function (UPF) XR02; and a Network Slice Selection Function (NSSF) XR29.

The UPF XR02 may act as an anchor point for intra-RAT and inter-RAT mobility, an external PDU session point of interconnect to DN XR03, and a branching point to support multi-homed PDU session. The UPF XR02 may also perform packet routing and forwarding, perform packet inspection, enforce user plane part of policy rules, lawfully intercept packets (UP collection), traffic usage reporting, perform QoS handling for user plane (e.g., packet filtering, gating, UL/DL rate enforcement), perform Uplink Traffic verification (e.g., SDF to QoS flow mapping), transport level packet marking in the uplink and downlink, and downlink packet buffering and downlink data notification triggering. UPF XR02 may include an uplink classifier to support routing traffic flows to a data network. The DN XR03 may represent various network operator services, Internet access, or third party services. DN XR03 may include, or be similar to, application server XQ30 discussed previously. The UPF XR02 may interact with the SMF XR24 via an N4 reference point between the SMF XR24 and the UPF XR02.

The AUSF XR22 may store data for authentication of UE XR01 and handle authentication related functionality. The AUSF XR22 may facilitate a common authentication framework for various access types. The AUSF XR22 may communicate with the AMF XR21 via an N12 reference point between the AMF XR21 and the AUSF XR22; and may communicate with the UDM XR27 via an N13 reference point between the UDM XR27 and the AUSF XR22. Additionally, the AUSF XR22 may exhibit an Nausf service-based interface.

The AMF XR21 may be responsible for registration management (e.g., for registering UE XR01, etc.), connection management, reachability management, mobility management, and lawful interception of AMF-related events, and access authentication and authorization. The AMF XR21 may be a termination point for an N11 reference point between the AMF XR21 and the SMF XR24. The AMF XR21 may provide transport for Session Management (SM) messages between the UE XR01 and the SMF XR24, and act as a transparent proxy for routing SM messages. AMF XR21 may also provide transport for short message service (SMS) messages between UE XR01 and an SMS function (SMSF) (not shown herein). AMF XR21 may act as Security Anchor Function (SEAF), which may include interaction with the AUSF XR22 and the UE XR01, as well as receipt of an intermediate key that was established as a result of the UE XR01 authentication process. Where UMTS Subscriber Identity Module (USIM) based authentication is used, the AMF XR21 may retrieve the security material from the AUSF XR22. AMF XR21 may also include a Security Context Management (SCM) function, which receives a key from the SEAF that it uses to derive access network specific keys. Furthermore, AMF XR21 may be a termination point of RAN CP interface, which may include or be an N2 reference point between the (R)AN XR11 and the AMF XR21; and the AMF XR21 may be a termination point of NAS (N1) signaling, and perform NAS ciphering and integrity protection.

AMF XR21 may also support NAS signaling with a UE XR01 over an N3 interworking-function (IWF) interface. The N3IWF may be used to provide access to untrusted entities. N3IWF may be a termination point for the N2 interface between the (R)AN XR11 and the AMF XR21 for the control plane, and may be a termination point for the N3 reference point between the (R)AN XR11 and the UPF XR02 for the user plane. As such, the AMF XR21 may handle N2 signaling from the SMF XR24 and the AMF XR21 for PDU sessions and QoS, encapsulate/de-encapsulate packets for IPSec and N3 tunneling, mark N3 user plane packets in the uplink, and enforce QoS corresponding to N3 packet marking, which may take into account QoS requirements associated to such marking received over N2. N3IWF may also relay uplink and downlink control plane NAS signaling between the UE XR01 and AMF XR21 via an N1 reference point between the UE XR01 and the AMF XR21, and relay uplink and downlink user plane packets between the UE XR01 and UPF XR02. The N3IWF also provides mechanisms for IPsec tunnel establishment with the UE XR01. The AMF XR21 may exhibit an Namf service-based interface, and may be a termination point for an N14 reference point between two AMFs XR21 and an N17 reference point between the AMF XR21 and a 5G-Equipment Identity Register (5G-EIR) (not shown herein).

The SMF XR24 may be responsible for session management (e.g., session establishment, modify and release, including tunnel maintain between UPF and AN node). The SMF XR24 may also allocate and manage UE IP addresses (including optional authorization), select and control UP functions, and configures traffic steering at the UPF XR02 to route traffic to a proper destination. The SMF XR24 may also terminate interfaces towards Policy Control Functions, control part of policy enforcement and QoS, and perform lawful interception (e.g., for SM events and interface to LI system). The SMF XR24 may also terminate SM parts of NAS messages, provide downlink data notification, and initiate AN specific SM information, sent via AMF over N2 to AN, and determine Session and Service Continuity (SSC) mode of a session.

The SMF XR24 may include the following roaming functionality: handle local enforcement to apply QoS SLAB (VPLMN); charging data collection and charging interface (VPLMN); lawful intercept (in VPLMN for SM events and interface to LI System); and support for interaction with external DN for transport of signaling for PDU session authorization/authentication by external DN. An N16 reference point between two SMFs XR24 may be included in the system XR00, which may be between another SMF XR24 in a visited network and the SMF XR24 in the home network in roaming scenarios. Additionally, the SMF XR24 may exhibit the Nsmf service-based interface.

The NEF XR23 may provide means for securely exposing the services and capabilities provided by 3GPP network functions for third party, internal exposure/re-exposure, Application Functions (e.g., AF XR28), edge computing or fog computing systems, etc. In such embodiments, the NEF XR23 may authenticate, authorize, and/or throttle the AFs. NEF XR23 may also translate information exchanged with the AF XR28 and information exchanged with internal network functions. For example, the NEF XR23 may translate between an AF-Service-Identifier and an internal 5GC information. NEF XR23 may also receive information from other network functions (NFs) based on exposed capabilities of other network functions. This information may be stored at the NEF XR23 as structured data, or at a data storage NF using standardized interfaces. The stored information can then be re-exposed by the NEF XR23 to other NFs and AFs, and/or used for other purposes such as analytics. Additionally, the NEF XR23 may exhibit an Nnef service-based interface.

The NRF XR25 may support service discovery functions, receive NF Discovery Requests from NF instances, and provide the information of the discovered NF instances to the NF instances. NRF XR25 also maintains information of available NF instances and their supported services. As used herein, the terms "instantiate", "instantiation", and the like may refer to the creation of an instance, and an "instance" may refer to a concrete occurrence of an object, which may occur, for example, during execution of program code. Additionally, the NRF XR25 may exhibit the Nnrf service-based interface.

The PCF XR26 may provide policy rules to control plane function(s) to enforce them, and may also support unified policy framework to govern network behavior. The PCF XR26 may also implement a front end (FE) to access subscription information relevant for policy decisions in a Unified Data Repository (UDR) of the UDM XR27. The PCF XR26 may communicate with the AMF XR21 via an N15 reference point between the PCF XR26 and the AMF XR21, which may include a PCF XR26 in a visited network and the AMF XR21 in case of roaming scenarios. The PCF XR26 may communicate with the AF XR28 via an N5 reference point between the PCF XR26 and the AF XR28; and with the SMF XR24 via an N7 reference point between the PCF XR26 and the SMF XR24. The system XR00 and/or CN XR20 may also include an N24 reference point between the PCF XR26 (in the home network) and a PCF XR26 in a visited network. Additionally, the PCF XR26 may exhibit an Npcf service-based interface.

The UDM XR27 may handle subscription-related information to support the network entities' handling of communication sessions, and may store subscription data of UE XR01. For example, subscription data may be communicated between the UDM XR27 and the AMF XR21 via an N8 reference point between the UDM XR27 and the AMF XR21 (not shown herein). The UDM XR27 may include two parts, an application FE and a User Data Repository (UDR) (the FE and UDR are not shown herein). The UDR may store subscription data and policy data for the UDM XR27 and the PCF XR26, and/or structured data for exposure and application data (including Packet Flow Descriptions (PFDs) for application detection, application request information for multiple UEs XR01) for the NEF XR23. The Nudr service-based interface may be exhibited by the UDR to allow the UDM XR27, PCF XR26, and NEF XR23 to access a particular set of the stored data, as well as to read, update (e.g., add, modify), delete, and subscribe to notification of relevant data changes in the UDR. The UDM XR27 may include a UDM FE, which is in charge of processing credentials, location management, subscription management and so on. Several different front ends may serve the same user in different transactions. The UDM FE accesses subscription information stored in the UDR and performs authentication credential processing; user identification handling; access authorization; registration/mobility management; and subscription management. The UDR may interact with the SMF XR24 via an N10 reference point between the UDM XR27 and the SMF XR24. UDM XR27 may also support SMS management, wherein an SMS-FE implements the similar application logic as discussed previously. Additionally, the UDM XR27 may exhibit the Nudm service-based interface.

The AF XR28 may provide application influence on traffic routing, provide access to the Network Capability Exposure (NCE), and interact with the policy framework for policy control. The NCE may be a mechanism that allows the 5GC and AF XR28 to provide information to each other via NEF XR23, which may be used for edge computing implementations. In such implementations, the network operator and third party services may be hosted close to the UE XR01 access point of attachment to achieve an efficient service delivery through the reduced end-to-end latency and load on the transport network. For edge computing implementations, the 5GC may select a UPF XR02 close to the UE XR01 and execute traffic steering from the UPF XR02 to DN XR03 via the N6 interface. This may be based on the UE subscription data, UE location, and information provided by the AF XR28. In this way, the AF XR28 may influence UPF (re)selection and traffic routing. Based on operator deployment, when AF XR28 is considered to be a trusted entity, the network operator may permit AF XR28 to interact directly with relevant NFs. Additionally, the AF XR28 may exhibit an Naf service-based interface.

The NSSF XR29 may select a set of network slice instances serving the UE XR01. The NSSF XR29 may also determine allowed Network Slice Selection Assistance Information (NSSAI) and the mapping to the Subscribed Single-NSSAIs (S-NSSAIs), if needed. The NSSF XR29 may also determine the AMF set to be used to serve the UE XR01, or a list of candidate AMF(s) XR21 based on a suitable configuration and possibly by querying the NRF XR25. The selection of a set of network slice instances for the UE XR01 may be triggered by the AMF XR21 with which the UE XR01 is registered by interacting with the NSSF XR29, which may lead to a change of AMF XR21. The NSSF XR29 may interact with the AMF XR21 via an N22 reference point between AMF XR21 and NSSF XR29; and may communicate with another NSSF XR29 in a visited network via an N31 reference point (not shown herein). Additionally, the NSSF XR29 may exhibit an Nnssf service-based interface.

As discussed previously, the CN XR20 may include an SMSF, which may be responsible for SMS subscription checking and verification, and relaying SM messages to/from the UE XR01 to/from other entities, such as an Short Message Service (SMS)-Global Systems for Mobile Communication (GMSC)/Inter-Working Mobile Switching Center (IWMSC)/SMS-router. The SMS may also interact with AMF XR21 and UDM XR27 for notification procedure that the UE XR01 is available for SMS transfer (e.g., set a UE not reachable flag, and notifying UDM XR27 when UE XR01 is available for SMS).

The CN XR20 may also include other elements that are not shown herein, such as a Data Storage system/architecture, a 5G-Equipment Identity Register (5G-EIR), a Security Edge Protection Proxy (SEPP), and the like. The Data Storage system may include a Structured Data Storage network function (SDSF), an Unstructured Data Storage network function (UDSF), and/or the like. Any NF may store and retrieve unstructured data into/from the UDSF (e.g., UE contexts), via N18 reference point between any NF and the UDSF (not shown herein). Individual NFs may share a UDSF for storing their respective unstructured data or individual NFs may each have their own UDSF located at or near the individual NFs. Additionally, the UDSF may exhibit an Nudsf service-based interface (not shown herein). The 5G-EIR may be an NF that checks the status of Permanent Equipment Identifiers (PEI) for determining whether particular equipment/entities are blacklisted from the network; and the SEPP may be a non-transparent proxy that performs topology hiding, message filtering, and policing on inter-PLMN control plane interfaces.

Additionally, there may be many more reference points and/or service-based interfaces between the NF services in the NFs; however, these interfaces and reference points have been omitted from Figures herein for clarity. In one example, the CN XR20 may include an Nx interface, which is an inter-CN interface between the MME (e.g., MME XQ21) and the AMF XR21 in order to enable interworking between CN XR20 and CN XQ20. Other example interfaces/reference points may include an N5g-EIR service-based interface exhibited by a 5G-EIR, an N27 reference point between an NRF in the visited network and the NRF in the home network; and an N31 reference point between the NSSF in the visited network and the NSSF in the home network.

In yet another example, system XR00 may include multiple RAN nodes XR11 wherein an Xn interface is defined between two or more RAN nodes XR11 (e.g., gNBs and the like) connecting to 5GC XR20, between a RAN node XR11 (e.g., gNB) connecting to 5GC XR20 and an eNB (e.g., a RAN node XQ11), and/or between two eNBs connecting to 5GC XR20. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; and mobility support for UE XR01 in a connected mode (e.g., CM-CONNECTED) including functionality to manage the UE mobility for connected mode between one or more RAN nodes XR11. The mobility support may include context transfer from an old (source) serving RAN node XR11 to new (target) serving RAN node XR11; and control of user plane tunnels between old (source) serving RAN node XR11 to new (target) serving RAN node XR11. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on an SCTP layer. The SCTP layer may be on top of an IP layer. The SCTP layer provides the guaranteed delivery of application layer messages. In the transport IP layer point-to-point transmission is used to deliver the signaling PDUs. In other implementations, the Xn-U protocol stack and/or the Xn-C protocol stack may be the same or similar to the user plane and/or control plane protocol stack(s) shown and described herein.

Figure 9:
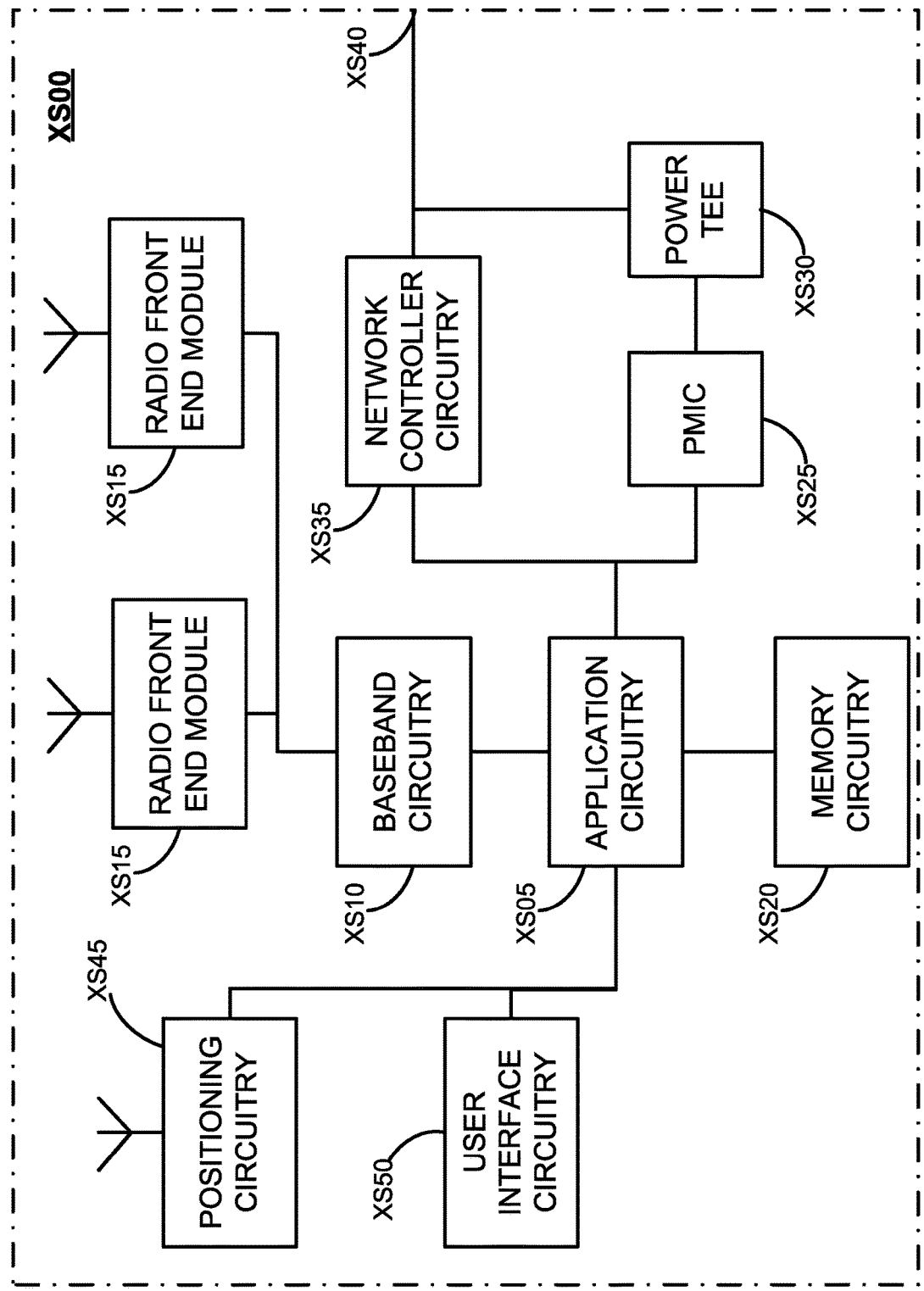
FIG. 9 illustrates an example of infrastructure equipment, in accordance with various embodiments.

FIG. 9 illustrates an example of infrastructure equipment XS00 in accordance with various embodiments. The infrastructure equipment XS00 (or "system XS00") may be implemented as a base station, radio head, RAN node, etc., such as the RAN nodes XQ11 and XQ12, and/or AP XQ06 shown and described previously. In other examples, the system XS00 could be implemented in or by a UE, application server(s) XQ30, and/or any other element/device discussed herein. The system XS00 may include one or more of application circuitry XS05, baseband circuitry XS10, one or more radio front end modules XS15, memory XS20, power management integrated circuitry (PMIC) XS25, power tee circuitry XS30, network controller XS35, network interface connector XS40, satellite positioning circuitry XS45, and user interface XS50. In some embodiments, the device XT00 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

As used herein, the term "circuitry" may refer to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (for example, a field-programmable gate array (FPGA), a programmable logic device (PLD), a complex PLD (CPLD), a high-capacity PLD (HCPLD), a structured ASIC, or a programmable System on Chip (SoC)), digital signal processors (DSPs), etc., that are configured to provide the described functionality. In some embodiments, the circuitry may execute one or more software or firmware programs to provide at least some of the described functionality. In addition, the term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The terms "application circuitry" and/or "baseband circuitry" may be considered synonymous to, and may be referred to as "processor circuitry." As used herein, the term "processor circuitry" may refer to, is part of, or includes circuitry capable of sequentially and automatically carrying out a sequence of arithmetic or logical operations; and recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes.

Furthermore, the various components of the core network XQ20 (or CN XR20 discussed previously) may be referred to as "network elements." The term "network element" may describe a physical or virtualized equipment used to provide wired or wireless communication network services. The term "network element" may be considered synonymous to and/or referred to as a networked computer, networking hardware, network equipment, network node, router, switch, hub, bridge, radio network controller, radio access network device, gateway, server, virtualized network function (VNF), network functions virtualization infrastructure (NFVI), and/or the like.

Application circuitry XS05 may include one or more central processing unit (CPU) cores and one or more of cache memory, low drop-out voltage regulators (LDOs), interrupt controllers, serial interfaces such as SPI, I2C or universal programmable serial interface module, real time clock (RTC), timer-counters including interval and watchdog timers, general purpose input/output (I/O or JO), memory card controllers such as Secure Digital (SD/)MultiMediaCard (MMC) or similar, Universal Serial Bus (USB) interfaces, Mobile Industry Processor Interface (MIPI) interfaces and Joint Test Access Group (JTAG) test access ports.

As examples, the application circuitry XS05 may include one or more Intel Pentium®, Core®, or Xeon® processor(s); Advanced Micro Devices (AMD) Ryzen® processor(s), Accelerated Processing Units (APUs), or Epyc® processors; and/or the like. In some embodiments, the system XS00 may not utilize application circuitry XS05, and instead may include a special-purpose processor/controller to process IP data received from an EPC or 5GC, for example.

Additionally or alternatively, application circuitry XS05 may include circuitry such as, but not limited to, one or more field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry XS05 may comprise logic blocks or logic fabric including other interconnected resources that may be programmed to perform various functions, such as the procedures, methods, functions, etc. of the various embodiments discussed herein. In such embodiments, the circuitry of application circuitry XS05 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in lookup-tables (LUTs) and the like.

The baseband circuitry XS10 may be implemented, for example, as a solder down substrate including one or more integrated circuits, a single packaged integrated circuit soldered to a main circuit board or a multi-chip module containing two or more integrated circuits. Although not shown, baseband circuitry XS10 may comprise one or more digital baseband systems, which may be coupled via an interconnect subsystem to a CPU subsystem, an audio subsystem, and an interface subsystem. The digital baseband subsystems may also be coupled to a digital baseband interface and a mixed-signal baseband sub-system via another interconnect subsystem. Each of the interconnect subsystems may include a bus system, point-to-point connections, network-on-chip (NOC) structures, and/or some other suitable bus or interconnect technology, such as those discussed herein. The audio sub-system may include digital signal processing circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry XS10 may include protocol processing circuitry with one or more instances of control circuitry (not shown) to provide control functions for the digital baseband circuitry and/or radio frequency circuitry (for example, the radio front end modules XS15).

User interface circuitry XS50 may include one or more user interfaces designed to enable user interaction with the system XS00 or peripheral component interfaces designed to enable peripheral component interaction with the system XS00. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a non-volatile memory port, a universal serial bus (USB) port, an audio jack, a power supply interface, etc.

The radio front end modules (RFEMs) XS15 may comprise a millimeter wave RFEM and one or more sub-millimeter wave radio frequency integrated circuits (RFICs). In some implementations, the one or more sub-millimeter wave RFICs may be physically separated from the millimeter wave RFEM. The RFICs may include connections to one or more antennas or antenna arrays, and the RFEM may be connected to multiple antennas. In alternative implementations, both millimeter wave and sub-millimeter wave radio functions may be implemented in the same physical radio front end module XS15. The RFEMs XS15 may incorporate both millimeter wave antennas and sub-millimeter wave antennas.

The memory circuitry XS20 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry XS20 may be implemented as one or more of solder down packaged integrated circuits, socketed memory modules and plug-in memory cards.

The PMIC XS25 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry XS30 may provide for electrical power drawn from a network cable to provide both power supply and data connectivity to the infrastructure equipment XS00 using a single cable.

The network controller circuitry XS35 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment XS00 via network interface connector XS40 using a physical connection, which may be electrical (commonly referred to as a "copper interconnect"), optical, or wireless. The network controller circuitry XS35 may include one or more dedicated processors and/or FPGAs to communicate using one or more of the aforementioned protocol. In some implementations, the network controller circuitry XS35 may include multiple controllers to provide connectivity to other networks using the same or different protocols.

The positioning circuitry XS45 may include circuitry to receive and decode signals transmitted by one or more navigation satellite constellations of a global navigation satellite system (GNSS). Examples of navigation satellite constellations (or GNSS) may include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry XS45 may comprise various hardware elements (e.g., including hardware devices such as switches, filters, amplifiers, antenna elements, and the like to facilitate the communications over-the-air (OTA) communications) to communicate with components of a positioning network, such as navigation satellite constellation nodes.

Nodes or satellites of the navigation satellite constellation(s) ("GNSS nodes") may provide positioning services by continuously transmitting or broadcasting GNSS signals along a line of sight, which may be used by GNSS receivers (e.g., positioning circuitry XS45 and/or positioning circuitry implemented by UEs XQ01, XQ02, or the like) to determine their GNSS position. The GNSS signals may include a pseudorandom code (e.g., a sequence of ones and zeros) that is known to the GNSS receiver and a message that includes a time of transmission (ToT) of a code epoch (e.g., a defined point in the pseudorandom code sequence) and the GNSS node position at the ToT. The GNSS receivers may monitor/measure the GNSS signals transmitted/broadcasted by a plurality of GNSS nodes (e.g., four or more satellites) and solve various equations to determine a corresponding GNSS position (e.g., a spatial coordinate). The GNSS receivers also implement clocks that are typically less stable and less precise than the atomic clocks of the GNSS nodes, and the GNSS receivers may use the measured GNSS signals to determine the GNSS receivers' deviation from true time (e.g., an offset of the GNSS receiver clock relative to the GNSS node time). In some embodiments, the positioning circuitry XS45 may include a Micro-Technology for Positioning, Navigation, and Timing (Micro-PNT) IC that uses a master timing clock to perform position tracking/estimation without GNSS assistance.

The GNSS receivers may measure the time of arrivals (ToAs) of the GNSS signals from the plurality of GNSS nodes according to its own clock. The GNSS receivers may determine time of flight (ToF) values for each received GNSS signal from the ToAs and the ToTs, and then may determine, from the ToFs, a three-dimensional (3D) position and clock deviation. The 3D position may then be converted into a latitude, longitude and altitude. The positioning circuitry XS45 may provide data to application circuitry XS05, which may include one or more of position data or time data. Application circuitry XS05 may use the time data to synchronize operations with other radio base stations (e.g., RAN nodes XQ11, XQ12, XR11 or the like).

The components shown FIG. 9 may communicate with one another using interface circuitry. As used herein, the term "interface circuitry" may refer to, is part of, or includes circuitry providing for the exchange of information between two or more components or devices. The term "interface circuitry" may refer to one or more hardware interfaces, for example, buses, input/output (I/O) interfaces, peripheral component interfaces, network interface cards, and/or the like. Any suitable bus technology may be used in various implementations, which may include any number of technologies, including industry standard architecture (ISA), extended ISA (EISA), peripheral component interconnect (PCI), peripheral component interconnect extended (PCIx), PCI express (PCIe), or any number of other technologies. The bus may be a proprietary bus, for example, used in a SoC based system. Other bus systems may be included, such as an I2C interface, an SPI interface, point-to-point interfaces, and a power bus, among others.

Figure 10:
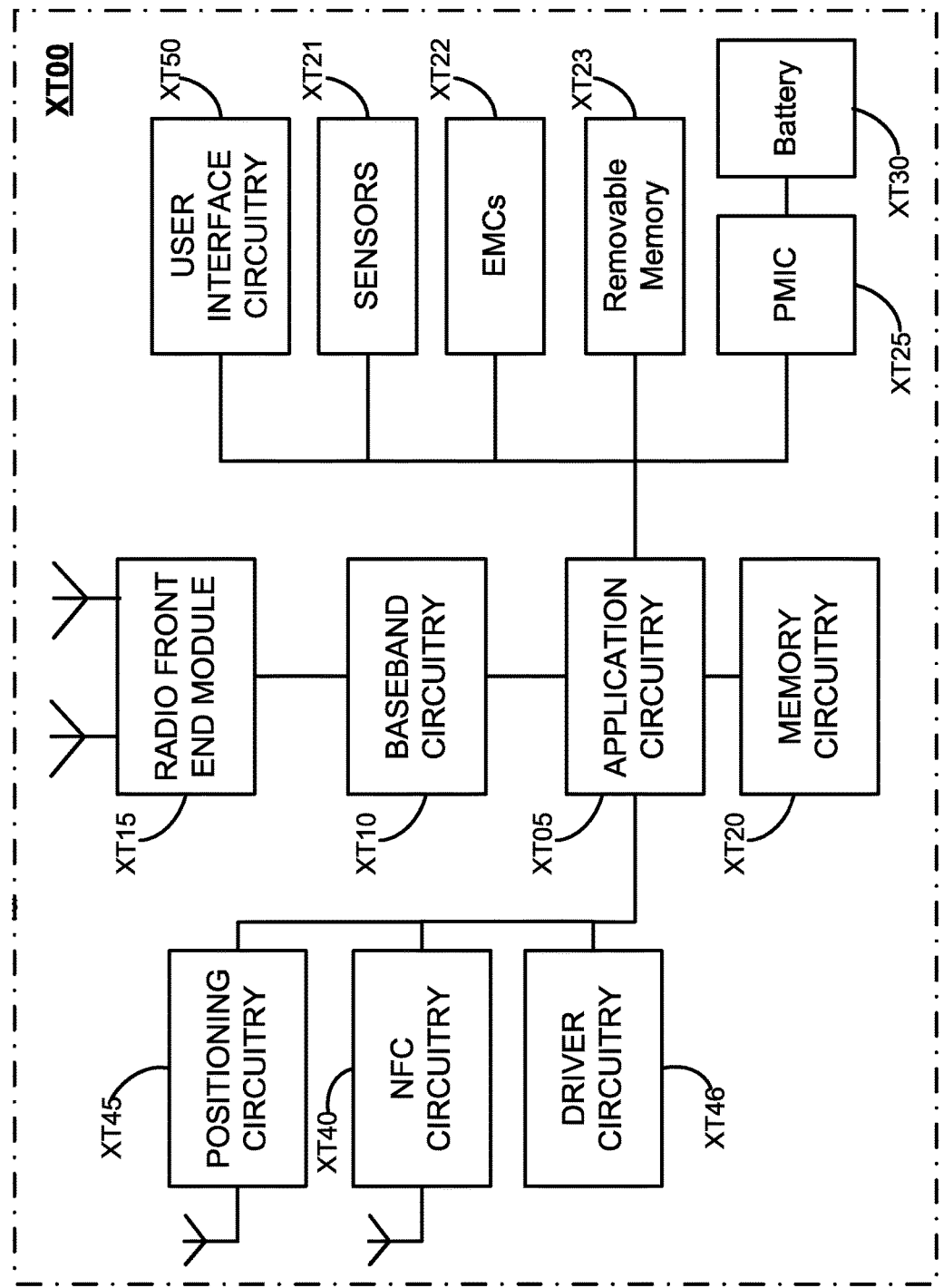
FIG. 10 illustrates an example of a computer platform XT00 (or "device XT00"), in accordance with various embodiments.

FIG. 10 illustrates an example of a platform XT00 (or "device XT00") in accordance with various embodiments. In embodiments, the computer platform XT00 may be suitable for use as UEs XQ01, XQ02, XR01, application servers XQ30, and/or any other element/device discussed herein. The platform XT00 may include any combinations of the components shown in the example. The components of platform XT00 may be implemented as integrated circuits (ICs), portions thereof, discrete electronic devices, or other modules, logic, hardware, software, firmware, or a combination thereof adapted in the computer platform XT00, or as components otherwise incorporated within a chassis of a larger system. The block diagram of FIG. 10 is intended to show a high level view of components of the computer platform XT00. However, some of the components shown may be omitted, additional components may be present, and different arrangement of the components shown may occur in other implementations.

The application circuitry XT05 may include circuitry such as, but not limited to single-core or multi-core processors and one or more of cache memory, low drop-out voltage regulators (LDOs), interrupt controllers, serial interfaces such as serial peripheral interface (SPI), inter-integrated circuit (I2C) or universal programmable serial interface circuit, real time clock (RTC), timer-counters including interval and watchdog timers, general purpose input-output (TO), memory card controllers such as secure digital/multimedia card (SD/MMC) or similar, universal serial bus (USB) interfaces, mobile industry processor interface (MIPI) interfaces and Joint Test Access Group (JTAG) test access ports. The processor(s) may include any combination of general-purpose processors and/or dedicated processors (e.g., graphics processors, application processors, etc.). The processors (or cores) may be coupled with or may include memory/storage and may be configured to execute instructions stored in the memory/storage to enable various applications or operating systems to run on the platform XT00. In some embodiments, processors of application circuitry XS05/XT05 may process IP data packets received from an EPC or 5GC.

Application circuitry XT05 may be or may include a microprocessor, a multi-core processor, a multithreaded processor, an ultra-low voltage processor, an embedded processor, or other known processing element. In one example, the application circuitry XT05 may include an Intel® Architecture Core™ based processor, such as a Quark™, an Atom™, an i3, an i5, an i7, or an MCU-class processor, or another such processor available from Intel® Corporation, Santa Clara, Calif. The processors of the application circuitry XT05 may also be one or more of Advanced Micro Devices (AMD) Ryzen® processor(s) or Accelerated Processing Units (APUs); A5-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc.; an ARM-based design licensed from ARM Holdings, Ltd.; or the like. In some implementations, the application circuitry XT05 may be a part of a system on a chip (SoC) in which the application circuitry XT05 and other components are formed into a single integrated circuit, or a single package, such as the Edison™ or Galileo™ SoC boards from Intel® Corporation.

Additionally or alternatively, application circuitry XT05 may include circuitry such as, but not limited to, one or more field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry XT05 may comprise logic blocks or logic fabric including other interconnected resources that may be programmed to perform various functions, such as the procedures, methods, functions, etc. of the various embodiments discussed herein. In such embodiments, the circuitry of application circuitry XT05 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in lookup-tables (LUTs) and the like.

The baseband circuitry XT10 may be implemented, for example, as a solder-down substrate including one or more integrated circuits, a single packaged integrated circuit soldered to a main circuit board or a multi-chip module containing two or more integrated circuits. Although not shown, baseband circuitry XT10 may comprise one or more digital baseband systems, which may be coupled via an interconnect subsystem to a CPU subsystem, an audio subsystem, and an interface subsystem. The digital baseband subsystems may also be coupled to a digital baseband interface and a mixed-signal baseband sub-system via another interconnect subsystem. Each of the interconnect subsystems may include a bus system, point-to-point connections, network-on-chip (NOC) structures, and/or some other suitable bus or interconnect technology, such as those discussed herein. The audio sub-system may include digital signal processing circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry XT10 may include protocol processing circuitry with one or more instances of control circuitry (not shown) to provide control functions for the digital baseband circuitry and/or radio frequency circuitry (for example, the radio front end modules XT15).

The radio front end modules (RFEMs) XT15 may comprise a millimeter wave RFEM and one or more sub-millimeter wave radio frequency integrated circuits (RFICs). In some implementations, the one or more sub-millimeter wave RFICs may be physically separated from the millimeter wave RFEM. The RFICs may include connections to one or more antennas or antenna arrays, and the RFEM may be connected to multiple antennas. In alternative implementations, both millimeter wave and sub-millimeter wave radio functions may be implemented in the same physical radio front end module XT15. The RFEMs XT15 may incorporate both millimeter wave antennas and sub-millimeter wave antennas.

The memory circuitry XT20 may include any number and type of memory devices used to provide for a given amount of system memory. As examples, the memory circuitry XT20 may include one or more of volatile memory including random access memory (RAM), dynamic RAM (DRAM) and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc. The memory circuitry XT20 may be developed in accordance with a Joint Electron Devices Engineering Council (JEDEC) low power double data rate (LPDDR)-based design, such as LPDDR2, LPDDR3, LPDDR4, or the like. Memory circuitry XT20 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry XT20 may be on-die memory or registers associated with the application circuitry XT05. To provide for persistent storage of information such as data, applications, operating systems and so forth, memory circuitry XT20 may include one or more mass storage devices, which may include, inter alia, a solid state disk drive (SSDD), hard disk drive (HDD), a micro HDD, resistance change memories, phase change memories, holographic memories, or chemical memories, among others. For example, the computer platform XT00 may incorporate the three-dimensional (3D) cross-point (XPOINT) memories from Intel® and Micron®.

Removable memory circuitry XT23 may include devices, circuitry, enclosures/housings, ports or receptacles, etc. used to coupled portable data storage devices with the platform XT00. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform XT00 may also include interface circuitry (not shown) that is used to connect external devices with the platform XT00. The external devices connected to the platform XT00 via the interface circuitry may include sensors XT21, such as accelerometers, level sensors, flow sensors, temperature sensors, pressure sensors, barometric pressure sensors, and the like. The interface circuitry may be used to connect the platform XT00 to electro-mechanical components (EMCs) XT22, which may allow platform XT00 to change its state, position, and/or orientation, or move or control a mechanism or system. The EMCs XT22 may include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform XT00 may be configured to operate one or more EMCs XT22 based on one or more captured events and/or instructions or control signals received from a service provider and/or various clients.

In some implementations, the interface circuitry may connect the platform XT00 with positioning circuitry XT45, which may be the same or similar as the positioning circuitry XS45 discussed with regard to FIG. 9.

In some implementations, the interface circuitry may connect the platform XT00 with near-field communication (NFC) circuitry XT40, which may include an NFC controller coupled with an antenna element and a processing device. The NFC circuitry XT40 may be configured to read electronic tags and/or connect with another NFC-enabled device.

The driver circuitry XT46 may include software and hardware elements that operate to control particular devices that are embedded in the platform XT00, attached to the platform XT00, or otherwise communicatively coupled with the platform XT00. The driver circuitry XT46 may include individual drivers allowing other components of the platform XT00 to interact or control various input/output (I/O) devices that may be present within, or connected to, the platform XT00. For example, driver circuitry XT46 may include a display driver to control and allow access to a display device, a touchscreen driver to control and allow access to a touchscreen interface of the platform XT00, sensor drivers to obtain sensor readings of sensors XT21 and control and allow access to sensors XT21, EMC drivers to obtain actuator positions of the EMCs XT22 and/or control and allow access to the EMCs XT22, a camera driver to control and allow access to an embedded image capture device, audio drivers to control and allow access to one or more audio devices.

The power management integrated circuitry (PMIC) XT25 (also referred to as "power management circuitry XT25") may manage power provided to various components of the platform XT00. In particular, with respect to the baseband circuitry XT10, the PMIC XT25 may control power-source selection, voltage scaling, battery charging, or DC-to-DC conversion. The PMIC XT25 may often be included when the platform XT00 is capable of being powered by a battery XT30, for example, when the device is included in a UE XQ01, XQ02, XR01.

In some embodiments, the PMIC XT25 may control, or otherwise be part of, various power saving mechanisms of the platform XT00. For example, if the platform XT00 is in an RRC Connected state, where it is still connected to the RAN node as it expects to receive traffic shortly, then it may enter a state known as Discontinuous Reception Mode (DRX) after a period of inactivity. During this state, the platform XT00 may power down for brief intervals of time and thus save power. If there is no data traffic activity for an extended period of time, then the platform XT00 may transition off to an RRC Idle state, where it disconnects from the network and does not perform operations such as channel quality feedback, handover, etc. The platform XT00 goes into a very low power state and it performs paging where again it periodically wakes up to listen to the network and then powers down again. The platform XT00 may not receive data in this state, in order to receive data, it must transition back to RRC Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery XT30 may power the platform XT00, although in some examples the platform XT00 may be mounted deployed in a fixed location, and may have a power supply coupled to an electrical grid. The battery XT30 may be a lithium ion battery, a metal-air battery, such as a zinc-air battery, an aluminum-air battery, a lithium-air battery, and the like. In some implementations, such as in V2X applications, the battery XT30 may be a typical lead-acid automotive battery.

In some implementations, the battery XT30 may be a "smart battery," which includes or is coupled with a Battery Management System (BMS) or battery monitoring integrated circuitry. The BMS may be included in the platform XT00 to track the state of charge (SoCh) of the battery XT30. The BMS may be used to monitor other parameters of the battery XT30 to provide failure predictions, such as the state of health (SoH) and the state of function (SoF) of the battery XT30. The BMS may communicate the information of the battery XT30 to the application circuitry XT05 or other components of the platform XT00. The BMS may also include an analog-to-digital (ADC) convertor that allows the application circuitry XT05 to directly monitor the voltage of the battery XT30 or the current flow from the battery XT30. The battery parameters may be used to determine actions that the platform XT00 may perform, such as transmission frequency, network operation, sensing frequency, and the like.

A power block, or other power supply coupled to an electrical grid may be coupled with the BMS to charge the battery XT30. In some examples, the power block XQ28 may be replaced with a wireless power receiver to obtain the power wirelessly, for example, through a loop antenna in the computer platform XT00. In these examples, a wireless battery charging circuit may be included in the BMS. The specific charging circuits chosen may depend on the size of the battery XT30, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

Although not shown, the components of platform XT00 may communicate with one another using a suitable bus technology, which may include any number of technologies, including industry standard architecture (ISA), extended ISA (EISA), peripheral component interconnect (PCI), peripheral component interconnect extended (PCIx), PCI express (PCIe), a Time-Trigger Protocol (TTP) system, or a FlexRay system, or any number of other technologies. The bus may be a proprietary bus, for example, used in a SoC based system. Other bus systems may be included, such as an I2C interface, an SPI interface, point-to-point interfaces, and a power bus, among others.

Figure 11:
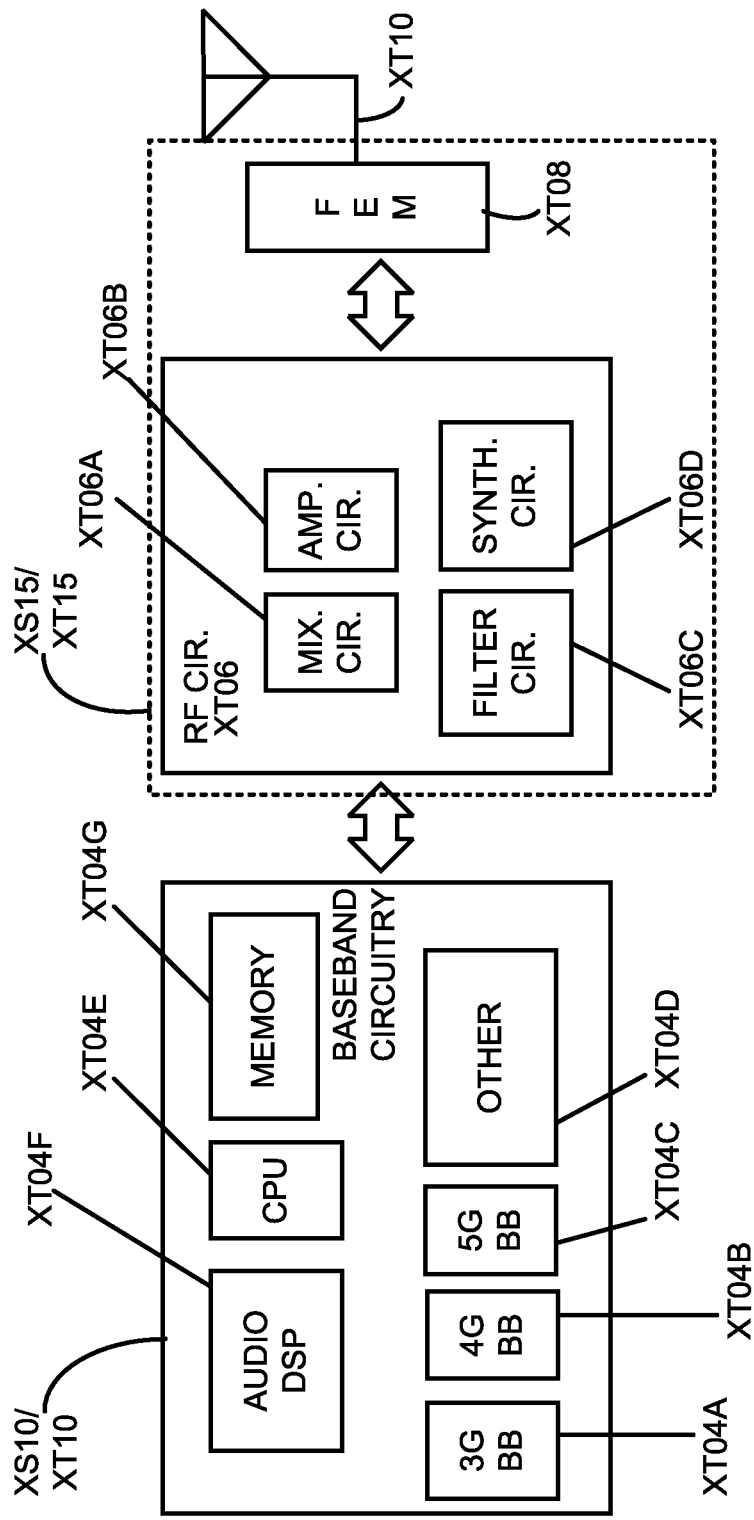
FIG. 11 illustrates example components of baseband circuitry and radio front end modules (RFEM), in accordance with various embodiments.

FIG. 11 illustrates example components of baseband circuitry XS10/XT10 and radio front end modules (RFEM) XS15/XT15 in accordance with some embodiments. As shown, the RFEM XS15/XT15 may include Radio Frequency (RF) circuitry XT06, front end module (FEM) circuitry XT08, one or more antennas XT10 coupled together at least as shown.

The baseband circuitry XS10/XT10 may include circuitry such as, but not limited to, one or more single-core or multi-core processors. The baseband circuitry XS10/XT10 may include one or more baseband processors or control logic to process baseband signals received from a receive signal path of the RF circuitry XT06 and to generate baseband signals for a transmit signal path of the RF circuitry XT06. Baseband processing circuitry XS10/XT10 may interface with the application circuitry XS05/XT05 for generation and processing of the baseband signals and for controlling operations of the RF circuitry XT06. For example, in some embodiments, the baseband circuitry XS10/XT10 may include a third generation (3G) baseband processor XT04A, a fourth generation (4G) baseband processor XT04B, a fifth generation (5G) baseband processor XT04C, or other baseband processor(s) XT04D for other existing generations, generations in development or to be developed in the future (e.g., second generation (2G), sixth generation (6G), etc.). The baseband circuitry XS10/XT10 (e.g., one or more of baseband processors XT04A-D) may handle various radio control functions that enable communication with one or more radio networks via the RF circuitry XT06. In other embodiments, some or all of the functionality of baseband processors XT04A-D may be included in modules stored in the memory XT04G and executed via a Central Processing Unit (CPU) XT04E. The radio control functions may include, but are not limited to, signal modulation/demodulation, encoding/decoding, radio frequency shifting, etc. In some embodiments, modulation/demodulation circuitry of the baseband circuitry XS10/XT10 may include Fast-Fourier Transform (FFT), precoding, or constellation mapping/demapping functionality. In some embodiments, encoding/decoding circuitry of the baseband circuitry XS10/XT10 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry XS10/XT10 may include one or more audio digital signal processor(s) (DSP) XT04F. The audio DSP(s) XT04F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry XS10/XT10 and the application circuitry XS05/XT05 may be implemented together such as, for example, on a system on a chip (SoC).

In some embodiments, the baseband circuitry XS10/XT10 may provide for communication compatible with one or more radio technologies. For example, in some embodiments, the baseband circuitry XS10/XT10 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry XS10/XT10 is configured to support radio communications of more than one wireless protocol may be referred to as multi-mode baseband circuitry.

RF circuitry XT06 may enable communication with wireless networks using modulated electromagnetic radiation through a non-solid medium. In various embodiments, the RF circuitry XT06 may include switches, filters, amplifiers, etc. to facilitate the communication with the wireless network. RF circuitry XT06 may include a receive signal path which may include circuitry to down-convert RF signals received from the FEM circuitry XT08 and provide baseband signals to the baseband circuitry XS10/XT10. RF circuitry XT06 may also include a transmit signal path which may include circuitry to up-convert baseband signals provided by the baseband circuitry XS10/XT10 and provide RF output signals to the FEM circuitry XT08 for transmission.

In some embodiments, the receive signal path of the RF circuitry XT06 may include mixer circuitry XT06a, amplifier circuitry XT06b and filter circuitry XT06c. In some embodiments, the transmit signal path of the RF circuitry XT06 may include filter circuitry XT06c and mixer circuitry XT06a. RF circuitry XT06 may also include synthesizer circuitry XT06d for synthesizing a frequency for use by the mixer circuitry XT06a of the receive signal path and the transmit signal path. In some embodiments, the mixer circuitry XT06a of the receive signal path may be configured to down-convert RF signals received from the FEM circuitry XT08 based on the synthesized frequency provided by synthesizer circuitry XT06d. The amplifier circuitry XT06b may be configured to amplify the down-converted signals and the filter circuitry XT06c may be a low-pass filter (LPF) or band-pass filter (BPF) configured to remove unwanted signals from the down-converted signals to generate output baseband signals. Output baseband signals may be provided to the baseband circuitry XS10/XT10 for further processing. In some embodiments, the output baseband signals may be zero-frequency baseband signals, although this is not a requirement. In some embodiments, mixer circuitry XT06*a* of the receive signal path may comprise passive mixers, although the scope of the embodiments is not limited in this respect.

In some embodiments, the mixer circuitry XT06*a* of the transmit signal path may be configured to up-convert input baseband signals based on the synthesized frequency provided by the synthesizer circuitry XT06*d* to generate RF output signals for the FEM circuitry XT08. The baseband signals may be provided by the baseband circuitry XS10/XT10 and may be filtered by filter circuitry XT06*c*.

In some embodiments, the mixer circuitry XT06*a* of the receive signal path and the mixer circuitry XT06*a* of the transmit signal path may include two or more mixers and may be arranged for quadrature downconversion and upconversion, respectively. In some embodiments, the mixer circuitry XT06*a* of the receive signal path and the mixer circuitry XT06*a* of the transmit signal path may include two or more mixers and may be arranged for image rejection (e.g., Hartley image rejection). In some embodiments, the mixer circuitry XT06*a* of the receive signal path and the mixer circuitry XT06*a* may be arranged for direct downconversion and direct upconversion, respectively. In some embodiments, the mixer circuitry XT06*a* of the receive signal path and the mixer circuitry XT06*a* of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry XT06 may include analog-to-digital converter (ADC) and digital-to-analog converter (DAC) circuitry and the baseband circuitry XS10/XT10 may include a digital baseband interface to communicate with the RF circuitry XT06.

In some dual-mode embodiments, a separate radio IC circuitry may be provided for processing signals for each spectrum, although the scope of the embodiments is not limited in this respect.

In some embodiments, the synthesizer circuitry XT06*d* may be a fractional-N synthesizer or a fractional N/N+1 synthesizer, although the scope of the embodiments is not limited in this respect as other types of frequency synthesizers may be suitable. For example, synthesizer circuitry XT06*d* may be a delta-sigma synthesizer, a frequency multiplier, or a synthesizer comprising a phase-locked loop with a frequency divider.

The synthesizer circuitry XT06*d* may be configured to synthesize an output frequency for use by the mixer circuitry XT06*a* of the RF circuitry XT06 based on a frequency input and a divider control input. In some embodiments, the synthesizer circuitry XT06*d* may be a fractional N/N+1 synthesizer.

In some embodiments, frequency input may be provided by a voltage controlled oscillator (VCO), although that is not a requirement. Divider control input may be provided by either the baseband circuitry XS10/XT10 or the applications processor XS05/XT05 depending on the desired output frequency. In some embodiments, a divider control input (e.g., N) may be determined from a look-up table based on a channel indicated by the applications processor XS05/XT05.

Synthesizer circuitry XT06*d* of the RF circuitry XT06 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry XT06*d* may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry XT06 may include an IQ/polar converter.

FEM circuitry XT08 may include a receive signal path which may include circuitry configured to operate on RF signals received from one or more antennas XT10, amplify the received signals and provide the amplified versions of the received signals to the RF circuitry XT06 for further processing. FEM circuitry XT08 may also include a transmit signal path which may include circuitry configured to amplify signals for transmission provided by the RF circuitry XT06 for transmission by one or more of the one or more antennas XT10. In various embodiments, the amplification through the transmit or receive signal paths may be done solely in the RF circuitry XT06, solely in the FEM XT08, or in both the RF circuitry XT06 and the FEM XT08.

In some embodiments, the FEM circuitry XT08 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry XT06). The transmit signal path of the FEM circuitry XT08 may include a power amplifier (PA) to amplify input RF signals (e.g., provided by RF circuitry XT06), and one or more filters to generate RF signals for subsequent transmission (e.g., by one or more of the one or more antennas XT10).

Processors of the application circuitry XS05/XT05 and processors of the baseband circuitry XS10/XT10 may be used to execute elements of one or more instances of a protocol stack. For example, processors of the baseband circuitry XS10/XT10, alone or in combination, may be used execute Layer 3, Layer 2, or Layer 1 functionality, while processors of the baseband circuitry XS10/XT10 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 12:
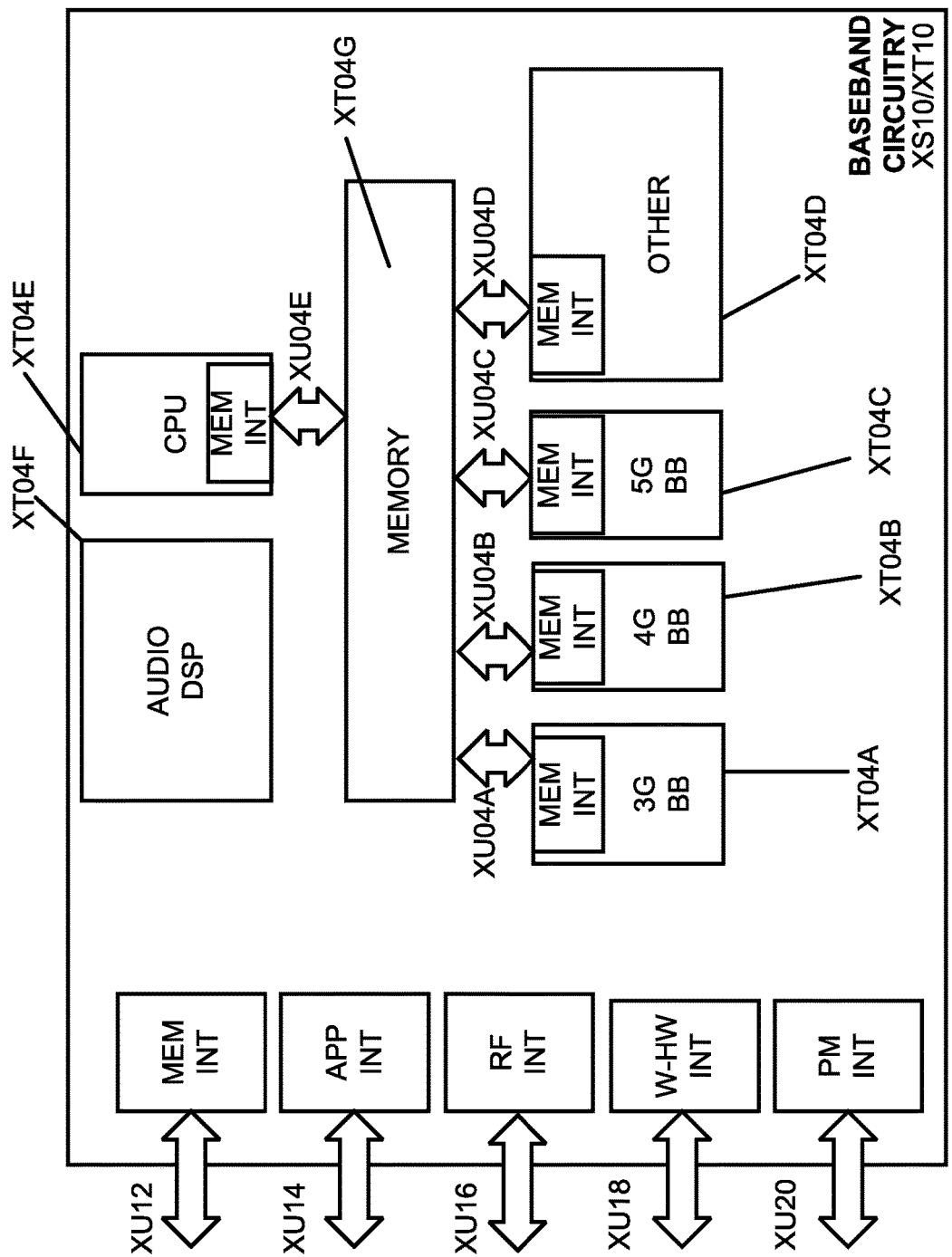
FIG. 12 illustrates example interfaces of baseband circuitry, in accordance with various embodiments.

FIG. 12 illustrates example interfaces of baseband circuitry in accordance with some embodiments. As discussed above, the baseband circuitry XS10/XT10 may comprise processors XT04A-XT04E and a memory XT04G utilized by said processors. Each of the processors XT04A-XT04E may include a memory interface, XU04A-XU04E, respectively, to send/receive data to/from the memory XT04G.

The baseband circuitry XS10/XT10 may further include one or more interfaces to communicatively couple to other circuitries/devices, such as a memory interface XU12 (e.g., an interface to send/receive data to/from memory external to the baseband circuitry XS10/XT10), an application circuitry interface XU14 (e.g., an interface to send/receive data to/from the application circuitry XS05/XT05), an RF circuitry interface XU16 (e.g., an interface to send/receive data to/from RF circuitry XT06), a wireless hardware connectivity interface XU18 (e.g., an interface to send/receive data to/from Near Field Communication (NFC) components, Bluetooth® components (e.g., Bluetooth® Low Energy), Wi-Fi® components, and other communication components), and a power management interface XU20 (e.g., an interface to send/receive power or control signals to/from the PMIC XT25.

Figure 13:
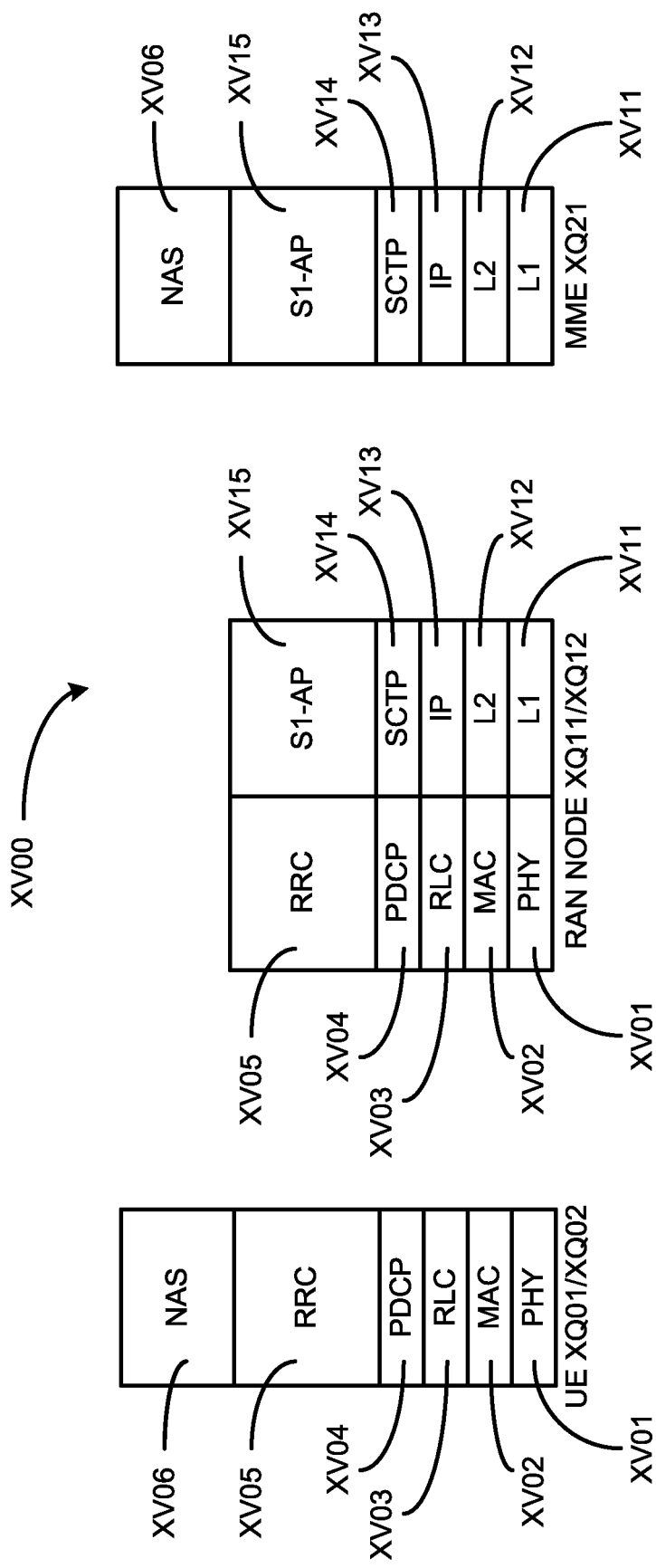
FIG. 13 is an illustration of a control plane protocol stack, in accordance with various embodiments.

FIG. 13 is an illustration of a control plane protocol stack in accordance with some embodiments. In this embodiment, a control plane XV00 is shown as a communications protocol stack between the UE XQ01 (or alternatively, the UE XQ02), the RAN node XQ11 (or alternatively, the RAN node XQ12), and the MME XQ21.

The PHY layer XV01 may transmit or receive information used by the MAC layer XV02 over one or more air interfaces. The PHY layer XV01 may further perform link adaptation or adaptive modulation and coding (AMC), power control, cell search (e.g., for initial synchronization and handover purposes), and other measurements used by higher layers, such as the RRC layer XV05. The PHY layer XV01 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer XV02 may perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARD), and logical channel prioritization.

The RLC layer XV03 may operate in a plurality of modes of operation, including: Transparent Mode™, Unacknowledged Mode (UM), and Acknowledged Mode (AM). The RLC layer XV03 may execute transfer of upper layer protocol data units (PDUs), error correction through automatic repeat request (ARQ) for AM data transfers, and concatenation, segmentation and reassembly of RLC SDUs for UM and AM data transfers. The RLC layer XV03 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

The PDCP layer XV04 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

The main services and functions of the RRC layer XV05 may include broadcast of system information (e.g., included in Master Information Blocks (MIBs) or System Information Blocks (SIBs) related to the non-access stratum (NAS)), broadcast of system information related to the access stratum (AS), paging, establishment, maintenance and release of an RRC connection between the UE and E-UTRAN (e.g., RRC connection paging, RRC connection establishment, RRC connection modification, and RRC connection release), establishment, configuration, maintenance and release of point to point Radio Bearers, security functions including key management, inter radio access technology (RAT) mobility, and measurement configuration for UE measurement reporting. Said MIBs and SIBs may comprise one or more information elements (IEs), which may each comprise individual data fields or data structures.

The UE XQ01 and the RAN node XQ11 may utilize a Uu interface (e.g., an LTE-Uu interface) to exchange control plane data via a protocol stack comprising the PHY layer XV01, the MAC layer XV02, the RLC layer XV03, the PDCP layer XV04, and the RRC layer XV05.

The non-access stratum (NAS) protocols XV06 form the highest stratum of the control plane between the UE XQ01 and the MME XQ21. The NAS protocols XV06 support the mobility of the UE XQ01 and the session management procedures to establish and maintain IP connectivity between the UE XQ01 and the P-GW XQ23.

The S1 Application Protocol (S1-AP) layer XV15 may support the functions of the S1 interface XQ13 and comprise Elementary Procedures (EPs). An EP is a unit of interaction between the RAN node XQ11 and the CN XQ20. The S1-AP layer services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The Stream Control Transmission Protocol (SCTP) layer (alternatively referred to as the SCTP/IP layer) XV14 may ensure reliable delivery of signaling messages between the RAN node XQ11 and the MME XQ21 based, in part, on the IP protocol, supported by the IP layer XV13. The L2 layer XV12 and the L1 layer XV11 may refer to communication links (e.g., wired or wireless) used by the RAN node and the MME to exchange information.

The RAN node XQ11 and the MME XQ21 may utilize an S1-MME interface to exchange control plane data via a protocol stack comprising the L1 layer XV11, the L2 layer XV12, the IP layer XV13, the SCTP layer XV14, and the S1-AP layer XV15.

Figure 14:
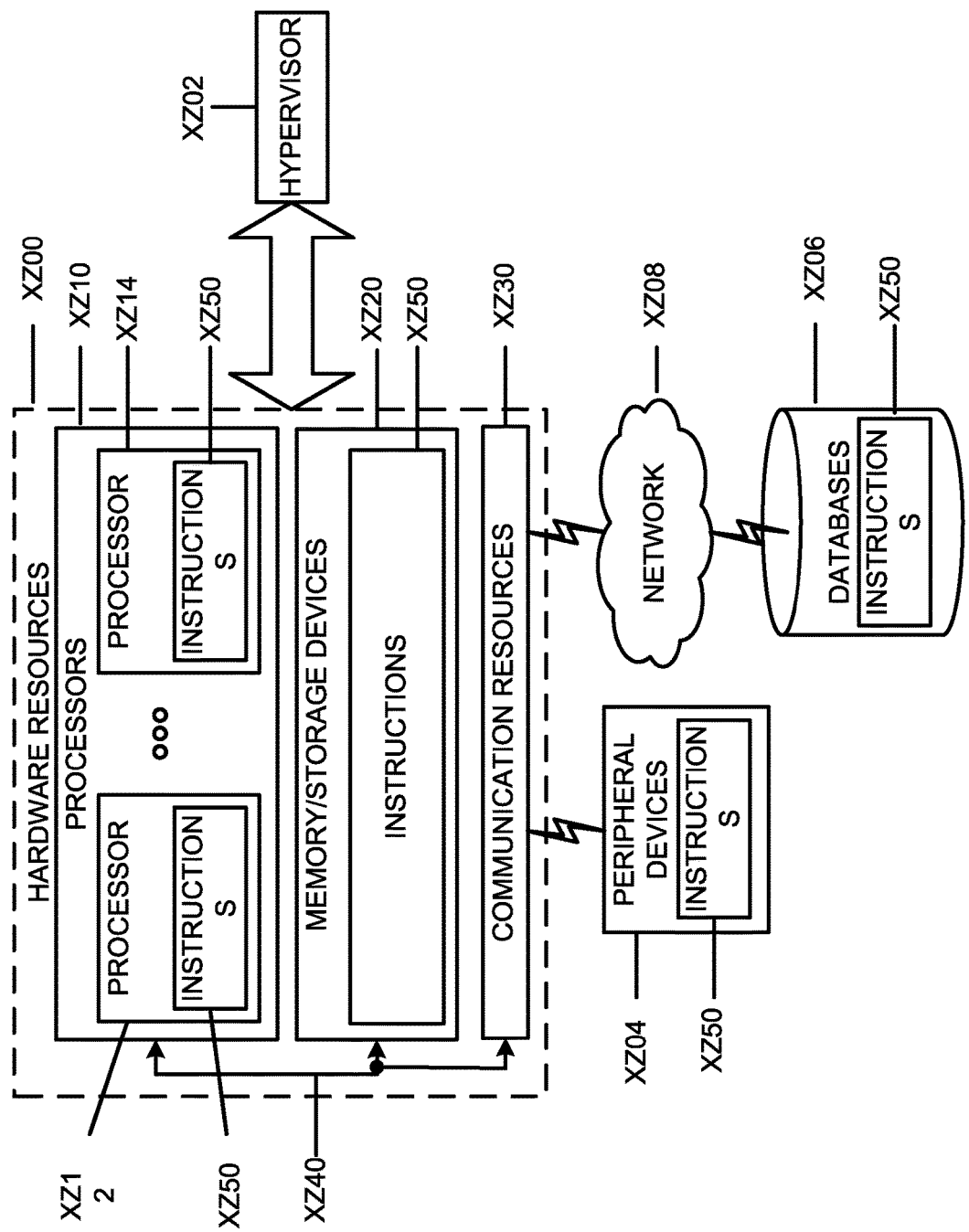
FIG. 14 is a block diagram illustrating components, according to some example embodiments, able to read instructions from a machine-readable or computer-readable medium (e.g., a non-transitory machine-readable storage medium) and perform any one or more of the techniques, processes, or methodologies discussed herein.

FIG. 14 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 14 shows a diagrammatic representation of hardware resources XZ00 including one or more processors (or processor cores) XZ10, one or more memory/storage devices XZ20, and one or more communication resources XZ30, each of which may be communicatively coupled via a bus XZ40. As used herein, the term "computing resource", "hardware resource", etc., may refer to a physical or virtual device, a physical or virtual component within a computing environment, and/or physical or virtual component within a particular device, such as computer devices, mechanical devices, memory space, processor/CPU time and/or processor/CPU usage, processor and accelerator loads, hardware time or usage, electrical power, input/output operations, ports or network sockets, channel/link allocation, throughput, memory usage, storage, network, database and applications, and/or the like. For embodiments where node virtualization (e.g., NFV) is utilized, a hypervisor XZ02 may be executed to provide an execution environment for one or more network slices/sub-slices to utilize the hardware resources XZ00. A "virtualized resource" may refer to compute, storage, and/or network resources provided by virtualization infrastructure to an application, device, system, etc.

The processors XZ10 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor XZ12 and a processor XZ14.

The memory/storage devices XZ20 may include main memory, disk storage, or any suitable combination thereof. The memory/storage devices XZ20 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources XZ30 may include interconnection or network interface components or other suitable devices to communicate with one or more peripheral devices XZ04 or one or more databases XZ06 via a network XZ08. For example, the communication resources XZ30 may include wired communication components (e.g., for coupling via a Universal Serial Bus (USB)), cellular communication components, NFC components, Bluetooth® components (e.g., Bluetooth® Low Energy), Wi-Fi® components, and other communication components. As used herein, the term "network resource" or "communication resource" may refer to computing resources that are accessible by computer devices via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

Instructions XZ50 may comprise software, a program, an application, an applet, an app, or other executable code for causing at least any of the processors XZ10 to perform any one or more of the methodologies discussed herein. The instructions XZ50 may reside, completely or partially, within at least one of the processors XZ10 (e.g., within the processor's cache memory), the memory/storage devices XZ20, or any suitable combination thereof. Furthermore, any portion of the instructions XZ50 may be transferred to the hardware resources XZ00 from any combination of the peripheral devices XZ04 or the databases XZ06. Accordingly, the memory of processors XZ10, the memory/storage devices XZ20, the peripheral devices XZ04, and the databases XZ06 are examples of computer-readable and machine-readable media.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

Example 1 includes a method comprising: identifying, by a base station, a parameter related to a zero power (ZP) resource element (RE) mapping set in a physical resource block (PRB), wherein the ZP RE mapping set relates to resources that are not to be used to transmit a physical channel transmission; and transmitting, by the base station to a user equipment (UE), an indication of the ZP RE mapping set.

Example 2 includes the method of example 1, further comprising identifying, by the base station, whether a ZP RE in the ZP RE mapping set collides with a RE related to another reference signal (RS) in the PRB.

Example 3 includes the method of example 2, further comprising identifying, by the base station, that if the ZP RE collides with a RE related to another RS in the PRB, the ZP RE is to be dropped and the RS is to be transmitted on the RE related to the RS.

Example 4 includes the method of example 2, further comprising identifying, by the base station, that if the ZP RE collides with a RE related to another RS in the PRB, the ZP RE RS is to not be transmitted on the RE related to the RS.

Example 5 includes the method of example 1, wherein the ZP RE mapping set is one of a plurality of ZP RE mapping sets that have been previously indicated to a UE by a radio resource layer (RRC) signal, and wherein the indication is an indication of a subset of the plurality of ZP RE mapping sets, wherein the subset includes the ZP RE mapping set.

Example 6 includes the method of example 1, wherein the ZP RE mapping set is related to a channel state information reference signal (CSI-RS) resource transmitted on 2 antenna ports or 3 antenna ports.

Example 7 includes the method of example 1, wherein the identifying the parameter includes identifying, by a radio resource control (RRC) entity of the base station, the parameter related to the ZP RE mapping set in the PRB.

Example 8 includes the method of any of examples 1-7, further comprising transmitting, by the base station to the UE based on the parameter related to the ZP RE mapping set, a portion of the physical channel transmission based on ZP REs in the ZP RE mapping set.

Example 9 includes the method of example D, wherein the physical channel transmission is a physical downlink shared channel (PDSCH) transmission.

Example 10 includes the method of any of examples 1-7, further comprising identifying, by the base station based on the parameter related to the ZP RE mapping set, a portion of the physical channel transmission received from the UE, wherein the portion of the physical channel transmission is transmitted by the UE based on ZP REs in the ZP RE mapping set.

Example 11 includes the method of example 10, wherein the physical channel transmission is a physical uplink shared channel (PUSCH) transmission.

Example 12 includes the method of any of examples 1-7, further comprising transmitting, by the base station, the indication of the ZP RE mapping set in a downlink control information (DCI) transmission.

Example 13 includes the method of any of examples 1-7, further comprising transmitting, by the base station, the indication of the ZP RE mapping set in a slot configuration transmission.

Example 14 includes the method of any of examples 1-7, wherein the indication of the ZP RE mapping set is a bitmap related to the ZP RE mapping set.

Example 15 includes the method of example 14, wherein the bitmap is a related to a location of the ZP RE mapping set in the frequency domain within the PRB.

Example 16 includes the method of example 15, wherein the bitmap is unrelated to a location of the ZP RE mapping set in the time domain.

Example 17 includes the method of any of examples 1-7, wherein the parameter is related to a number of PRBs allocated for transmission of the ZP RE mapping set.

Example 18 includes the method of any of examples 1-7, wherein the parameter is related to a slot configuration for the transmission of the ZP RE mapping set.

Example 19 includes the method of any of examples 1-7, wherein the parameter is related to a slot offset of the ZP RE mapping set.

Example 20 includes the method of any of examples 1-7, wherein the parameter is related to a slot periodicity of the ZP RE mapping set.

Example 21 includes the method of any of examples 1-7, wherein the parameter has a slot-level granularity.

Example 22 includes a method comprising: identifying, by a user equipment (UE), a transmission received from a base station; and identifying, by the UE based on the transmission, an indication related to a zero power (ZP) resource element (RE) mapping set in a physical resource block (PRB), wherein the ZP RE mapping set relates to a physical channel transmission and is based on a parameter identified by the base station.

Example 23 includes the method of example 22, wherein the ZP RE mapping set is one of a plurality of ZP RE mapping sets that have been previously indicated to a UE by a radio resource layer (RRC) signal, and wherein the indication is an indication of a subset of the plurality of ZP RE mapping sets, wherein the subset includes the ZP RE mapping set.

Example 24 includes the method of example 22, wherein the ZP RE mapping set is related to a channel state information reference signal (CSI-RS) resource transmitted on 2 antenna ports or 3 antenna ports.

Example 25 includes the method of example 22, wherein the parameter is configured by a radio resource control (RRC) entity of the base station.

Example 26 includes the method of any of examples 22-25, further comprising transmitting, by the UE to the base station based on the indication related to the ZP RE mapping set, a portion of the physical channel transmission using ZP REs in the ZP RE mapping set.

Example 27 includes the method of example 26, wherein the physical channel transmission is a physical uplink shared channel (PUSCH) transmission.

Example 28 includes the method of any of examples 22-25, further comprising identifying, by the UE based on the indication related to the ZP RE mapping set, a portion of the physical channel transmission received from the base station, wherein the portion of the physical channel transmission us transmitted by the UE using ZP REs in the ZP RE mapping set.

Example 29 includes the method of example 29, wherein the physical channel transmission is a physical downlink shared channel (PDSCH) transmission.

Example 30 includes the method of any of examples 22-25, wherein the transmission is a downlink control information (DCI) transmission.

Example 31 includes the method of any of examples 22-25, wherein the transmission is a slot configuration transmission.

Example 32 includes the method of any of examples 22-25, wherein the indication of the ZP RE mapping set is a bitmap related to the ZP RE mapping set.

Example 33 includes the method of example 32, wherein the bitmap is a related to a location of the ZP RE mapping set in the frequency domain.

Example 34 includes the method of example 33, wherein the bitmap is unrelated to a location of the ZP RE mapping set in the time domain.

Example 35 includes the method of any of examples 22-25, wherein the parameter is related to a number of PRBs allocated for transmission of the ZP RE mapping set.

Example 36 includes the method of any of examples 22-25, wherein the parameter is related to a slot configuration for the transmission of the ZP RE mapping set.

Example 37 includes the method of any of examples 22-25, wherein the parameter is related to a slot offset of the ZP RE mapping set.

Example 38 includes the method of any of examples 22-25, wherein the parameter is related to a slot periodicity of the ZP RE mapping set.

Example 39 includes the method of any of examples 22-25, wherein the parameter has a slot-level granularity.

Example 40 includes a method comprising: selecting, by a base station, a first parameter from a plurality of first parameters and a second parameter from a plurality of second parameters; generating, by the base station, a physical channel resource element (RE) mapping set based on the first parameter and the second parameter; and transmitting, by the base station via a media access control (MAC) layer transmission, an indication of the physical channel RE mapping set to a user equipment (UE).

Example 41 includes the method of example 40, wherein the physical channel is a physical downlink shared channel (PDSCH) and the RE mapping set indicates a resource on which a PDSCH transmission may be transmitted.

Example 42 includes the method of example 41, further comprising transmitting, by the base station, a PDSCH transmission on a resource indicated by the physical channel RE mapping set.

Example 43 includes the method of example 40, wherein the physical channel is a physical uplink shared channel (PUSCH) and the RE mapping set indicates a resource on which a PUSCH transmission may be transmitted.

Example 44 includes the method of example 43, further comprising identifying, by the base station, a PUSCH transmission received from the UE on a resource indicated by the physical channel RE mapping set.

Example 45 includes the method of any of examples 40-44, wherein the first parameter is a physical channel starting symbol that indicates a starting position of a physical channel transmission based on the physical channel RE mapping set.

Example 46 includes the method of any of examples 40-44, wherein the first parameter is a physical channel end symbol that indicates a duration of a physical channel transmission based on the physical channel RE mapping set.

Example 47 includes the method of any of examples 40-44, wherein the first parameter is a number of physical channel symbols that indicate a duration of a physical channel transmission based on the physical channel RE mapping set.

Example 48 includes the method of any of examples 40-44, wherein the first parameter is a zero power (ZP) channel state information reference signal (CSI-RS) identifier (ID) that indicates that a ZP CSI-RS resource is present in a slot of a physical channel transmission based on the physical channel RE mapping set.

Example 49 includes the method of example 48, wherein the ZP CSI-RS ID includes an indication of a slot configuration.

Example 50 includes the method of any of examples 40-44, wherein the first parameter is an index of a virtual cell identifier (VCID) related to demodulation reference signal (DM-RS) modulation.

Example 51 includes the method of any of examples 40-44, wherein the first parameter is related to a quasi co-location (QCL) set.

Example 52 includes the method of any of examples 40-44, wherein the first parameter is a waveform index related to a physical channel transmission based on the physical channel RE mapping set.

Example 53 includes the method of any of examples 40-44, wherein the first parameter is related to a demodulation reference signal (DM-RS) pattern to be used for demodulation or transmission of a physical channel transmission based on the physical channel RE mapping set.

Example 54 includes the method of any of examples 40-44, wherein the selecting includes selecting, by a radio resource control (RRC) entity of the base station, the first parameter and the second parameter.

Example 55 includes a method comprising: identifying, by a user equipment (UE), a media access control (MAC) layer transmission that includes an indication of a physical channel resource element (RE) mapping set, the indication transmitted by a base station; and identifying, by the UE based on the physical channel RE mapping set, a first parameter and a second parameter related to a physical channel transmission, wherein the first parameter is selected by the base station from a plurality of first parameters, and the second parameter is selected by the base station from a plurality of second parameters.

Example 56 includes the method of example 55, wherein the physical channel is a physical uplink shared channel (PUSCH) and the RE mapping set indicates a resource on which a PUSCH transmission may be transmitted.

Example 57 includes the method of example 56, further comprising transmitting, by the UE, a PUSCH transmission on a resource indicated by the physical channel RE mapping set.

Example 58 includes the method of example 55, wherein the physical channel is a physical downlink shared channel (PDSCH) and the RE mapping set indicates a resource on which a PDSCH transmission may be transmitted.

Example 59 includes the method of example 58, further comprising identifying, by the UE, a PDSCH transmission received from the base station on a resource indicated by the physical channel RE mapping set.

Example 60 includes the method of any of examples 55-59, wherein the first parameter is a physical channel starting symbol that indicates a starting position of a physical channel transmission based on the physical channel RE mapping set.

Example 61 includes the method of any of examples 55-59, wherein the first parameter is a physical channel end symbol that indicates a duration of a physical channel transmission based on the physical channel RE mapping set.

Example 62 includes the method of any of examples 55-59, wherein the first parameter is a number of physical channel symbols that indicate a duration of a physical channel transmission based on the physical channel RE mapping set.

Example 63 includes the method of any of examples 55-59, wherein the first parameter is a zero power (ZP) channel state information reference signal (CSI-RS) identifier (ID) that indicates that a ZP CSI-RS resource is present in a slot of a physical channel transmission based on the physical channel RE mapping set.

Example 64 includes the method of example 63, wherein the ZP CSI-RS ID includes an indication of a slot configuration.

Example 65 includes the method of any of examples 55-59, wherein the first parameter is an index of a virtual cell identifier (VCID) related to demodulation reference signal (DM-RS) modulation.

Example 66 includes the method of any of examples 55-59, wherein the first parameter is related to a quasi co-location (QCL) set.

Example 67 includes the method of any of examples 55-59, wherein the first parameter is a waveform index related to a physical channel transmission based on the physical channel RE mapping set.

Example 68 includes the method of any of examples 55-59, wherein the first parameter is related to a demodulation reference signal (DM-RS) pattern to be used for demodulation or transmission of a physical channel transmission based on the physical channel RE mapping set.

Example 69 includes one or more computer-readable media comprising instructions that, upon execution by one or more processors of a base station, are to cause the base station to: identify a parameter related to a zero power (ZP) resource element (RE) mapping set in a physical resource block (PRB), wherein the ZP RE mapping set relates to resources that are not to be used to transmit a physical channel transmission; and transmit, to a user equipment (UE), an indication of the ZP RE mapping set.

Example 70 includes the one or more computer-readable media of example 69, wherein the instructions are further to identify whether a ZP RE in the ZP RE mapping set collides with a RE related to another reference signal (RS) in the PRB.

Example 71 includes the one or more computer-readable media of example 70, wherein the instructions are further to identify that if the ZP RE collides with a RE related to another RS in the PRB, the ZP RE is to be dropped and the RS is to be transmitted on the RE related to the RS.

Example 72 includes the one or more computer-readable media of example 70, wherein the instructions are further to identify that if the ZP RE collides with a RE related to another RS in the PRB, the ZP RE RS is to not be transmitted on the RE related to the RS.

Example 73 includes the one or more computer-readable media of example 69, wherein the ZP RE mapping set is one of a plurality of ZP RE mapping sets that have been previously indicated to a UE by a radio resource layer (RRC) signal, and wherein the indication is an indication of a subset of the plurality of ZP RE mapping sets, wherein the subset includes the ZP RE mapping set.

Example 74 includes the one or more computer-readable media of example 69, wherein the ZP RE mapping set is related to a channel state information reference signal (CSI-RS) resource transmitted on 2 antenna ports or 3 antenna ports.

Example 75 includes the one or more computer-readable media of example 69, wherein the instructions to identify the parameter include instructions to identify, by a radio resource control (RRC) entity of the base station, the parameter related to the ZP RE mapping set in the PRB.

Example 76 includes the one or more computer-readable media of any of examples 69-75, wherein the instructions are further to transmit, to the UE based on the parameter related to the ZP RE mapping set, a portion of the physical channel transmission based on ZP REs in the ZP RE mapping set.

Example 77 includes the one or more computer-readable media of example 76, wherein the physical channel transmission is a physical downlink shared channel (PDSCH) transmission.

Example 78 includes the one or more computer-readable media of any of examples 69-75, wherein the instructions are further to identify, based on the parameter related to the ZP RE mapping set, a portion of the physical channel transmission received from the UE, wherein the portion of the physical channel transmission is transmitted by the UE based on ZP REs in the ZP RE mapping set.

Example 79 includes the one or more computer-readable media of example 78, wherein the physical channel transmission is a physical uplink shared channel (PUSCH) transmission.

Example 80 includes the one or more computer-readable media of any of examples 69-75, wherein the instructions are further to transmit the indication of the ZP RE mapping set in a downlink control information (DCI) transmission.

Example 81 includes the one or more computer-readable media of any of examples 69-75, wherein the instructions are further to transmit the indication of the ZP RE mapping set in a slot configuration transmission.

Example 82 includes the one or more computer-readable media of any of examples 69-75, wherein the indication of the ZP RE mapping set is a bitmap related to the ZP RE mapping set.

Example 83 includes the one or more computer-readable media of example 82, wherein the bitmap is a related to a location of the ZP RE mapping set in the frequency domain within the PRB.

Example 84 includes the one or more computer-readable media of example 83, wherein the bitmap is unrelated to a location of the ZP RE mapping set in the time domain.

Example 85 includes the one or more computer-readable media of any of examples 69-75, wherein the parameter is related to a number of PRBs allocated for transmission of the ZP RE mapping set.

Example 86 includes the one or more computer-readable media of any of examples 69-75, wherein the parameter is related to a slot configuration for the transmission of the ZP RE mapping set.

Example 87 includes the one or more computer-readable media of any of examples 69-75, wherein the parameter is related to a slot offset of the ZP RE mapping set.

Example 88 includes the one or more computer-readable media of any of examples 69-75, wherein the parameter is related to a slot periodicity of the ZP RE mapping set.

Example 89 includes the one or more computer-readable media of any of examples 69-75, wherein the parameter has a slot-level granularity.

Example 90 includes one or more computer-readable media comprising instructions that, upon execution of the instructions by one or more processors of a user equipment (UE), are to cause the UE to: identify a transmission received from a base station; and identify, by the UE based on the transmission, an indication related to a zero power (ZP) resource element (RE) mapping set in a physical resource block (PRB), wherein the ZP RE mapping set relates to a physical channel transmission and is based on a parameter identified by the base station.

Example 91 includes the one or more computer-readable media of example 90, wherein the ZP RE mapping set is one of a plurality of ZP RE mapping sets that have been previously indicated to a UE by a radio resource layer (RRC) signal, and wherein the indication is an indication of a subset of the plurality of ZP RE mapping sets, wherein the subset includes the ZP RE mapping set.

Example 92 includes the one or more computer-readable media of example 90, wherein the ZP RE mapping set is related to a channel state information reference signal (CSI-RS) resource transmitted on 2 antenna ports or 3 antenna ports.

Example 93 includes the one or more computer-readable media of example 90, wherein the parameter is configured by a radio resource control (RRC) entity of the base station.

Example 94 includes the one or more computer-readable media of any of examples 90-93, wherein the instructions are further to transmit, to the base station based on the indication related to the ZP RE mapping set, a portion of the physical channel transmission using ZP REs in the ZP RE mapping set.

Example 95 includes the one or more computer-readable media of example 94, wherein the physical channel transmission is a physical uplink shared channel (PUSCH) transmission.

Example 96 includes the one or more computer-readable media of any of examples 90-93, wherein the instructions are further to identify, based on the indication related to the ZP RE mapping set, a portion of the physical channel transmission received from the base station, wherein the portion of the physical channel transmission us transmitted by the UE using ZP REs in the ZP RE mapping set.

Example 97 includes the one or more computer-readable media of example 96, wherein the physical channel transmission is a physical downlink shared channel (PDSCH) transmission.

Example 98 includes the one or more computer-readable media of any of examples 90-93, wherein the transmission is a downlink control information (DCI) transmission.

Example 99 includes the one or more computer-readable media of any of examples 90-93, wherein the transmission is a slot configuration transmission.

Example 100 includes the one or more computer-readable media of any of examples 90-93, wherein the indication of the ZP RE mapping set is a bitmap related to the ZP RE mapping set.

Example 101 includes the one or more computer-readable media of example 100, wherein the bitmap is a related to a location of the ZP RE mapping set in the frequency domain.

Example 102 includes the one or more computer-readable media of example 101, wherein the bitmap is unrelated to a location of the ZP RE mapping set in the time domain.

Example 103 includes the one or more computer-readable media of any of examples 90-93, wherein the parameter is related to a number of PRBs allocated for transmission of the ZP RE mapping set.

Example 104 includes the one or more computer-readable media of any of examples 90-93, wherein the parameter is related to a slot configuration for the transmission of the ZP RE mapping set.

Example 105 includes the one or more computer-readable media of any of examples 90-93, wherein the parameter is related to a slot offset of the ZP RE mapping set.

Example 106 includes the one or more computer-readable media of any of examples 90-93, wherein the parameter is related to a slot periodicity of the ZP RE mapping set.

Example 107 includes the one or more computer-readable media of any of examples 90-93, wherein the parameter has a slot-level granularity.

Example 108 includes one or more non-transitory computer-readable media comprising instructions that, upon execution of the instructions by one or more processors of a base station, are to cause the base station to: select a first parameter from a plurality of first parameters and a second parameter from a plurality of second parameters; generate a physical channel resource element (RE) mapping set based on the first parameter and the second parameter; and transmit, via a media access control (MAC) layer transmission, an indication of the physical channel RE mapping set to a user equipment (UE).

Example 109 includes the one or more computer-readable media of example 108, wherein the physical channel is a physical downlink shared channel (PDSCH) and the RE mapping set indicates a resource on which a PDSCH transmission may be transmitted.

Example 110 includes the one or more computer-readable media of example 109, wherein the instructions are further to transmit a PDSCH transmission on a resource indicated by the physical channel RE mapping set.

Example 111 includes the one or more computer-readable media of example 108, wherein the physical channel is a physical uplink shared channel (PUSCH) and the RE mapping set indicates a resource on which a PUSCH transmission may be transmitted.

Example 112 includes the one or more computer-readable media of example 111, wherein the instructions are further to identify a PUSCH transmission received from the UE on a resource indicated by the physical channel RE mapping set.

Example 113 includes the one or more computer-readable media of any of examples 108-112, wherein the first parameter is a physical channel starting symbol that indicates a starting position of a physical channel transmission based on the physical channel RE mapping set.

Example 114 includes the one or more computer-readable media of any of examples 108-112, wherein the first parameter is a physical channel end symbol that indicates a duration of a physical channel transmission based on the physical channel RE mapping set.

Example 115 includes the one or more computer-readable media of any of examples 108-112, wherein the first parameter is a number of physical channel symbols that indicate a duration of a physical channel transmission based on the physical channel RE mapping set.

Example 116 includes the one or more computer-readable media of any of examples 108-112, wherein the first parameter is a zero power (ZP) channel state information reference signal (CSI-RS) identifier (ID) that indicates that a ZP CSI-RS resource is present in a slot of a physical channel transmission based on the physical channel RE mapping set.

Example 117 includes the one or more computer-readable media of example 116, wherein the ZP CSI-RS ID includes an indication of a slot configuration.

Example 118 includes the one or more computer-readable media of any of examples 108-112, wherein the first parameter is an index of a virtual cell identifier (VCID) related to demodulation reference signal (DM-RS) modulation.

Example 119 includes the one or more computer-readable media of any of examples 108-112, wherein the first parameter is related to a quasi co-location (QCL) set.

Example 120 includes the one or more computer-readable media of any of examples 108-112, wherein the first parameter is a waveform index related to a physical channel transmission based on the physical channel RE mapping set.

Example 121 includes the one or more computer-readable media of any of examples 108-112, wherein the first parameter is related to a demodulation reference signal (DM-RS) pattern to be used for demodulation or transmission of a physical channel transmission based on the physical channel RE mapping set.

Example 122 includes the one or more computer-readable media of any of examples 108-112, wherein the instructions to select include instructions to select, by a radio resource control (RRC) entity of the base station, the first parameter and the second parameter.

Example 123 includes one or more computer-readable media comprising instructions that, upon execution of the instructions by one or more processors of a user equipment (UE), are to cause the UE to: identify a media access control (MAC) layer transmission that includes an indication of a physical channel resource element (RE) mapping set, the indication transmitted by a base station; and identify, based on the physical channel RE mapping set, a first parameter and a second parameter related to a physical channel transmission, wherein the first parameter is selected by the base station from a plurality of first parameters, and the second parameter is selected by the base station from a plurality of second parameters.

Example 124 includes the one or more computer-readable media of example 123, wherein the physical channel is a physical uplink shared channel (PUSCH) and the RE mapping set indicates a resource on which a PUSCH transmission may be transmitted.

Example 125 includes the one or more computer-readable media of example 124, wherein the instructions are further to transmit a PUSCH transmission on a resource indicated by the physical channel RE mapping set.

Example 126 includes the one or more computer-readable media of example 123, wherein the physical channel is a physical downlink shared channel (PDSCH) and the RE mapping set indicates a resource on which a PDSCH transmission may be transmitted.

Example 127 includes the one or more computer-readable media of example 126, wherein the instructions are further to identify a PDSCH transmission received from the base station on a resource indicated by the physical channel RE mapping set.

Example 128 includes the one or more computer-readable media of any of examples 123-127, wherein the first parameter is a physical channel starting symbol that indicates a starting position of a physical channel transmission based on the physical channel RE mapping set.

Example 129 includes the one or more computer-readable media of any of examples 123-127, wherein the first parameter is a physical channel end symbol that indicates a duration of a physical channel transmission based on the physical channel RE mapping set.

Example 130 includes the one or more computer-readable media of any of examples 123-127, wherein the first parameter is a number of physical channel symbols that indicate a duration of a physical channel transmission based on the physical channel RE mapping set.

Example 131 includes the one or more computer-readable media of any of examples 123-127, wherein the first parameter is a zero power (ZP) channel state information reference signal (CSI-RS) identifier (ID) that indicates that a ZP CSI-RS resource is present in a slot of a physical channel transmission based on the physical channel RE mapping set.

Example 132 includes the one or more computer-readable media of example 131, wherein the ZP CSI-RS ID includes an indication of a slot configuration.

Example 133 includes the one or more computer-readable media of any of examples 123-127, wherein the first parameter is an index of a virtual cell identifier (VCID) related to demodulation reference signal (DM-RS) modulation.

Example 134 includes the one or more computer-readable media of any of examples 123-127, wherein the first parameter is related to a quasi co-location (QCL) set.

Example 135 includes the one or more computer-readable media of any of examples 123-127, wherein the first parameter is a waveform index related to a physical channel transmission based on the physical channel RE mapping set.

Example 136 includes the one or more computer-readable media of any of examples 123-127, wherein the first parameter is related to a demodulation reference signal (DM-RS) pattern to be used for demodulation or transmission of a physical channel transmission based on the physical channel RE mapping set.

Example 137 includes a base station comprising: means to identify a parameter related to a zero power (ZP) resource element (RE) mapping set in a physical resource block (PRB), wherein the ZP RE mapping set relates to resources that are not to be used to transmit a physical channel transmission; and means to transmit, to a user equipment (UE), an indication of the ZP RE mapping set.

Example 138 includes the base station of example 137, further comprising means to identify whether a ZP RE in the ZP RE mapping set collides with a RE related to another reference signal (RS) in the PRB.

Example 139 includes the base station of example 138, further comprising means to identify that if the ZP RE collides with a RE related to another RS in the PRB, the ZP RE is to be dropped and the RS is to be transmitted on the RE related to the RS.

Example 140 includes the base station of example 138, further comprising means to identify that if the ZP RE collides with a RE related to another RS in the PRB, the ZP RE RS is to not be transmitted on the RE related to the RS.

Example 141 includes the base station of example 137, wherein the ZP RE mapping set is one of a plurality of ZP RE mapping sets that have been previously indicated to a UE by a radio resource layer (RRC) signal, and wherein the indication is an indication of a subset of the plurality of ZP RE mapping sets, wherein the subset includes the ZP RE mapping set.

Example 142 includes the base station of example 137, wherein the ZP RE mapping set is related to a channel state information reference signal (CSI-RS) resource transmitted on 2 antenna ports or 3 antenna ports.

Example 143 includes the base station of example 137, wherein the means to identify the parameter include means to identify, by a radio resource control (RRC) entity of the base station, the parameter related to the ZP RE mapping set in the PRB.

Example 144 includes the base station of any of examples 137-143, further comprising means to transmit, to the UE based on the parameter related to the ZP RE mapping set, a portion of the physical channel transmission based on ZP REs in the ZP RE mapping set.

Example 145 includes the base station of example 144, wherein the physical channel transmission is a physical downlink shared channel (PDSCH) transmission.

Example 146 includes the base station of any of examples 137-143, further comprising means to identify, based on the parameter related to the ZP RE mapping set, a portion of the physical channel transmission received from the UE, wherein the portion of the physical channel transmission is transmitted by the UE based on ZP REs in the ZP RE mapping set.

Example 147 includes the base station of example 146, wherein the physical channel transmission is a physical uplink shared channel (PUSCH) transmission.

Example 148 includes the base station of any of examples 137-143, further comprising means to transmit the indication of the ZP RE mapping set in a downlink control information (DCI) transmission.

Example 149 includes the base station of any of examples 137-143, further comprising means to transmit the indication of the ZP RE mapping set in a slot configuration transmission.

Example 150 includes the base station of any of examples 137-143, wherein the indication of the ZP RE mapping set is a bitmap related to the ZP RE mapping set.

Example 151 includes the base station of any of examples 137-143, wherein the bitmap is a related to a location of the ZP RE mapping set in the frequency domain within the PRB.

Example 152 includes the base station of example 151, wherein the bitmap is unrelated to a location of the ZP RE mapping set in the time domain.

Example 153 includes the base station of any of examples 137-143, wherein the parameter is related to a number of PRBs allocated for transmission of the ZP RE mapping set.

Example 154 includes the base station of any of examples 137-143, wherein the parameter is related to a slot configuration for the transmission of the ZP RE mapping set.

Example 155 includes the base station of any of examples 137-143, wherein the parameter is related to a slot offset of the ZP RE mapping set.

Example 156 includes the base station of any of examples 137-143, wherein the parameter is related to a slot periodicity of the ZP RE mapping set.

Example 157 includes the base station of any of examples 137-143, wherein the parameter has a slot-level granularity.

Example 158 includes a user equipment (UE) comprising: means to identify a transmission received from a base station; and means to identify, based on the transmission, an indication related to a zero power (ZP) resource element (RE) mapping set in a physical resource block (PRB), wherein the ZP RE mapping set relates to a physical channel transmission and is based on a parameter identified by the base station.

Example 159 includes the UE of example 158, wherein the ZP RE mapping set is one of a plurality of ZP RE mapping sets that have been previously indicated to a UE by a radio resource layer (RRC) signal, and wherein the indication is an indication of a subset of the plurality of ZP RE mapping sets, wherein the subset includes the ZP RE mapping set.

Example 160 includes the UE of example 158, wherein the ZP RE mapping set is related to a channel state information reference signal (CSI-RS) resource transmitted on 2 antenna ports or 3 antenna ports.

Example 161 includes the UE of example 158, wherein the parameter is configured by a radio resource control (RRC) entity of the base station.

Example 162 includes the UE of any of examples 158-161, further comprising means to transmit, to the base station based on the indication related to the ZP RE mapping set, a portion of the physical channel transmission using ZP REs in the ZP RE mapping set.

Example 163 includes the UE of example 162, wherein the physical channel transmission is a physical uplink shared channel (PUSCH) transmission.

Example 164 includes the UE of any of examples 158-161, further comprising means to identify, based on the indication related to the ZP RE mapping set, a portion of the physical channel transmission received from the base station, wherein the portion of the physical channel transmission us transmitted by the UE using ZP REs in the ZP RE mapping set.

Example 165 includes the UE of example 164, wherein the physical channel transmission is a physical downlink shared channel (PDSCH) transmission.

Example 166 includes the UE of any of examples 158-161, wherein the transmission is a downlink control information (DCI) transmission.

Example 167 includes the UE of any of examples 158-161, wherein the transmission is a slot configuration transmission.

Example 168 includes the UE of any of examples 158-161, wherein the indication of the ZP RE mapping set is a bitmap related to the ZP RE mapping set.

Example 169 includes the UE of example 168, wherein the bitmap is a related to a location of the ZP RE mapping set in the frequency domain.

Example 170 includes the UE of example 169, wherein the bitmap is unrelated to a location of the ZP RE mapping set in the time domain.

Example 171 includes the UE of any of examples 158-161, wherein the parameter is related to a number of PRBs allocated for transmission of the ZP RE mapping set.

Example 172 includes the UE of any of examples 158-161, wherein the parameter is related to a slot configuration for the transmission of the ZP RE mapping set.

Example 173 includes the UE of any of examples 158-161, wherein the parameter is related to a slot offset of the ZP RE mapping set.

Example 174 includes the UE of any of examples 158-161, wherein the parameter is related to a slot periodicity of the ZP RE mapping set.

Example 175 includes the UE of any of examples 158-161, wherein the parameter has a slot-level granularity.

Example 176 includes a base station comprising: means to select a first parameter from a plurality of first parameters and a second parameter from a plurality of second parameters; means to generate a physical channel resource element (RE) mapping set based on the first parameter and the second parameter; and means to transmit, via a media access control (MAC) layer transmission, an indication of the physical channel RE mapping set to a user equipment (UE).

Example 177 includes the base station of example 176, wherein the physical channel is a physical downlink shared channel (PDSCH) and the RE mapping set indicates a resource on which a PDSCH transmission may be transmitted.

Example 178 includes the base station of example 177, further comprising means to transmit a PDSCH transmission on a resource indicated by the physical channel RE mapping set.

Example 179 includes the base station of example 176, wherein the physical channel is a physical uplink shared channel (PUSCH) and the RE mapping set indicates a resource on which a PUSCH transmission may be transmitted.

Example 180 includes the base station of example 179, further comprising means to identify a PUSCH transmission received from the UE on a resource indicated by the physical channel RE mapping set.

Example 181 includes the base station of any of examples 176-180, wherein the first parameter is a physical channel starting symbol that indicates a starting position of a physical channel transmission based on the physical channel RE mapping set.

Example 182 includes the base station of any of examples 176-180, wherein the first parameter is a physical channel end symbol that indicates a duration of a physical channel transmission based on the physical channel RE mapping set.

Example 183 includes the base station of any of examples 176-180, wherein the first parameter is a number of physical channel symbols that indicate a duration of a physical channel transmission based on the physical channel RE mapping set.

Example 184 includes the base station of any of examples 176-180, wherein the first parameter is a zero power (ZP) channel state information reference signal (CSI-RS) identifier (ID) that indicates that a ZP CSI-RS resource is present in a slot of a physical channel transmission based on the physical channel RE mapping set.

Example 185 includes the base station of example 184, wherein the ZP CSI-RS ID includes an indication of a slot configuration.

Example 186 includes the base station of any of examples 176-180, wherein the first parameter is an index of a virtual cell identifier (VCID) related to demodulation reference signal (DM-RS) modulation.

Example 187 includes the base station of any of examples 176-180, wherein the first parameter is related to a quasi co-location (QCL) set.

Example 188 includes the base station of any of examples 176-180, wherein the first parameter is a waveform index related to a physical channel transmission based on the physical channel RE mapping set.

Example 189 includes the base station of any of examples 176-180, wherein the first parameter is related to a demodulation reference signal (DM-RS) pattern to be used for demodulation or transmission of a physical channel transmission based on the physical channel RE mapping set.

Example 190 includes the base station of any of examples 176-180, wherein the means to select include means to select, by a radio resource control (RRC) entity of the base station, the first parameter and the second parameter.

Example 191 includes a user equipment (UE) comprising: means to identify a media access control (MAC) layer transmission that includes an indication of a physical channel resource element (RE) mapping set, the indication transmitted by a base station; and means to identify, based on the physical channel RE mapping set, a first parameter and a second parameter related to a physical channel transmission, wherein the first parameter is selected by the base station from a plurality of first parameters, and the second parameter is selected by the base station from a plurality of second parameters.

Example 192 includes the UE of example 191, wherein the physical channel is a physical uplink shared channel (PUSCH) and the RE mapping set indicates a resource on which a PUSCH transmission may be transmitted.

Example 193 includes the UE of example 192, further comprising means to transmit a PUSCH transmission on a resource indicated by the physical channel RE mapping set.

Example 194 includes the UE of example 191, wherein the physical channel is a physical downlink shared channel (PDSCH) and the RE mapping set indicates a resource on which a PDSCH transmission may be transmitted.

Example 195 includes the UE of example 194, further comprising means to identify a PDSCH transmission received from the base station on a resource indicated by the physical channel RE mapping set.

Example 196. UE of any of examples 191-195, wherein the first parameter is a physical channel starting symbol that indicates a starting position of a physical channel transmission based on the physical channel RE mapping set.

Example 197 includes the UE of any of examples 191-195, wherein the first parameter is a physical channel end symbol that indicates a duration of a physical channel transmission based on the physical channel RE mapping set.

Example 198 includes the UE of any of examples 191-195, wherein the first parameter is a number of physical channel symbols that indicate a duration of a physical channel transmission based on the physical channel RE mapping set.

Example 199 includes the UE of any of examples 191-195, wherein the first parameter is a zero power (ZP) channel state information reference signal (CSI-RS) identifier (ID) that indicates that a ZP CSI-RS resource is present in a slot of a physical channel transmission based on the physical channel RE mapping set.

Example 200 includes the UE of example 199, wherein the ZP CSI-RS ID includes an indication of a slot configuration.

Example 201 includes the UE of any of examples 191-195, wherein the first parameter is an index of a virtual cell identifier (VCID) related to demodulation reference signal (DM-RS) modulation.

Example 202 includes the UE of any of examples 191-195, wherein the first parameter is related to a quasi co-location (QCL) set.

Example 203 includes the UE of any of examples 191-195, wherein the first parameter is a waveform index related to a physical channel transmission based on the physical channel RE mapping set.

Example 204 includes the UE of any of examples 191-195, wherein the first parameter is related to a demodulation reference signal (DM-RS) pattern to be used for demodulation or transmission of a physical channel transmission based on the physical channel RE mapping set.

Example 205 includes a base station comprising: a processor; and one or more computer-readable media comprising instructions that, upon execution by the processor, are to cause the base station to: identify a parameter related to a zero power (ZP) resource element (RE) mapping set in a physical resource block (PRB), wherein the ZP RE mapping set relates to resources that are not to be used to transmit a physical channel transmission; and transmit, to a user equipment (UE), an indication of the ZP RE mapping set.

Example 206 includes the base station of example 205, wherein the instructions are further to identify whether a ZP RE in the ZP RE mapping set collides with a RE related to another reference signal (RS) in the PRB.

Example 207 includes the base station of example 206, wherein the instructions are further to identify that if the ZP RE collides with a RE related to another RS in the PRB, the ZP RE is to be dropped and the RS is to be transmitted on the RE related to the RS.

Example 208 includes the base station of example 206, wherein the instructions are further to identify that if the ZP RE collides with a RE related to another RS in the PRB, the ZP RE RS is to not be transmitted on the RE related to the RS.

Example 209 includes the base station of example 205, wherein the ZP RE mapping set is one of a plurality of ZP RE mapping sets that have been previously indicated to a UE by a radio resource layer (RRC) signal, and wherein the indication is an indication of a subset of the plurality of ZP RE mapping sets, wherein the subset includes the ZP RE mapping set.

Example 210 includes the base station of example 205, wherein the ZP RE mapping set is related to a channel state information reference signal (CSI-RS) resource transmitted on 2 antenna ports or 3 antenna ports.

Example 211 includes the base station of example 205, wherein the instructions to identify the parameter include instructions to identify, by a radio resource control (RRC) entity of the base station, the parameter related to the ZP RE mapping set in the PRB.

Example 212 includes the base station of any of examples 205-211, wherein the instructions are further to transmit, to the UE based on the parameter related to the ZP RE mapping set, a portion of the physical channel transmission based on ZP REs in the ZP RE mapping set.

Example 213 includes the base station of example 212, wherein the physical channel transmission is a physical downlink shared channel (PDSCH) transmission.

Example 214 includes the base station of any of examples 205-211, wherein the instructions are further to identify, based on the parameter related to the ZP RE mapping set, a portion of the physical channel transmission received from the UE, wherein the portion of the physical channel transmission is transmitted by the UE based on ZP REs in the ZP RE mapping set.

Example 215 includes the base station of example 214, wherein the physical channel transmission is a physical uplink shared channel (PUSCH) transmission.

Example 216 includes the base station of any of examples 205-211, wherein the instructions are further to transmit the indication of the ZP RE mapping set in a downlink control information (DCI) transmission.

Example 217 includes the base station of any of examples 205-211, wherein the instructions are further to transmit the indication of the ZP RE mapping set in a slot configuration transmission.

Example 218 includes the base station of any of examples 205-211, wherein the indication of the ZP RE mapping set is a bitmap related to the ZP RE mapping set.

Example 219 includes the base station of example 218, wherein the bitmap is a related to a location of the ZP RE mapping set in the frequency domain within the PRB.

Example 220 includes the base station of example 219, wherein the bitmap is unrelated to a location of the ZP RE mapping set in the time domain.

Example 221 includes the base station of any of examples 205-211, wherein the parameter is related to a number of PRBs allocated for transmission of the ZP RE mapping set.

Example 222 includes the base station of any of examples 205-211, wherein the parameter is related to a slot configuration for the transmission of the ZP RE mapping set.

Example 223 includes the base station of any of examples 205-211, wherein the parameter is related to a slot offset of the ZP RE mapping set.

Example 224 includes the base station of any of examples 205-211, wherein the parameter is related to a slot periodicity of the ZP RE mapping set.

Example 225 includes the base station of any of examples 205-211, wherein the parameter has a slot-level granularity.

Example 226 includes a user equipment (UE) comprising: a processor; and one or more computer-readable media comprising instructions that, upon execution of the instructions by the processor, are to cause the UE to: identify a transmission received from a base station; and identify, based on the transmission, an indication related to a zero power (ZP) resource element (RE) mapping set in a physical resource block (PRB), wherein the ZP RE mapping set relates to a physical channel transmission and is based on a parameter identified by the base station.

Example 227 includes the UE of example 226, wherein the ZP RE mapping set is one of a plurality of ZP RE mapping sets that have been previously indicated to a UE by a radio resource layer (RRC) signal, and wherein the indication is an indication of a subset of the plurality of ZP RE mapping sets, wherein the subset includes the ZP RE mapping set.

Example 228 includes the UE of example 226, wherein the ZP RE mapping set is related to a channel state information reference signal (CSI-RS) resource transmitted on 2 antenna ports or 3 antenna ports.

Example 229 includes the UE of example 226, wherein the parameter is configured by a radio resource control (RRC) entity of the base station.

Example 230 includes the UE of any of examples 226-229, wherein the instructions are further to transmit, to the base station based on the indication related to the ZP RE mapping set, a portion of the physical channel transmission using ZP REs in the ZP RE mapping set.

Example 231 includes the UE of example 230, wherein the physical channel transmission is a physical uplink shared channel (PUSCH) transmission.

Example 232 includes the UE of any of examples 226-229, wherein the instructions are further to identify, based on the indication related to the ZP RE mapping set, a portion of the physical channel transmission received from the base station, wherein the portion of the physical channel transmission us transmitted by the UE using ZP REs in the ZP RE mapping set.

Example 233 includes the UE of example 232, wherein the physical channel transmission is a physical downlink shared channel (PDSCH) transmission.

Example 234 includes the UE of any of examples 226-229, wherein the transmission is a downlink control information (DCI) transmission.

Example 235 includes the UE of any of examples 226-229, wherein the transmission is a slot configuration transmission.

Example 236 includes the UE of any of examples 226-229, wherein the indication of the ZP RE mapping set is a bitmap related to the ZP RE mapping set.

Example 237 includes the UE of example 236, wherein the bitmap is a related to a location of the ZP RE mapping set in the frequency domain.

Example 238 includes the UE of example 237, wherein the bitmap is unrelated to a location of the ZP RE mapping set in the time domain.

Example 239 includes the UE of any of examples 226-229, wherein the parameter is related to a number of PRBs allocated for transmission of the ZP RE mapping set.

Example 240 includes the UE of any of examples 226-229, wherein the parameter is related to a slot configuration for the transmission of the ZP RE mapping set.

Example 241 includes the UE of any of examples 226-229, wherein the parameter is related to a slot offset of the ZP RE mapping set.

Example 242 includes the UE of any of examples 226-229, wherein the parameter is related to a slot periodicity of the ZP RE mapping set.

Example 243 includes the UE of any of examples 226-229, wherein the parameter has a slot-level granularity.

Example 244 includes a base station comprising: a processor; and one or more non-transitory computer-readable media comprising instructions that, upon execution of the instructions by the processor, are to cause the base station to: select a first parameter from a plurality of first parameters and a second parameter from a plurality of second parameters; generate a physical channel resource element (RE) mapping set based on the first parameter and the second parameter; and transmit, via a media access control (MAC) layer transmission, an indication of the physical channel RE mapping set to a user equipment (UE).

Example 245 includes the base station of example 244, wherein the physical channel is a physical downlink shared channel (PDSCH) and the RE mapping set indicates a resource on which a PDSCH transmission may be transmitted.

Example 246 includes the base station of example 245, wherein the instructions are further to transmit a PDSCH transmission on a resource indicated by the physical channel RE mapping set.

Example 247 includes the base station of example 244, wherein the physical channel is a physical uplink shared channel (PUSCH) and the RE mapping set indicates a resource on which a PUSCH transmission may be transmitted.

Example 248 includes the base station of example 247, wherein the instructions are further to identify a PUSCH transmission received from the UE on a resource indicated by the physical channel RE mapping set.

Example 249 includes the base station of any of examples 244-248, wherein the first parameter is a physical channel starting symbol that indicates a starting position of a physical channel transmission based on the physical channel RE mapping set.

Example 250 includes the base station of any of examples 244-248, wherein the first parameter is a physical channel end symbol that indicates a duration of a physical channel transmission based on the physical channel RE mapping set.

Example 251 includes the base station of any of examples 244-248, wherein the first parameter is a number of physical channel symbols that indicate a duration of a physical channel transmission based on the physical channel RE mapping set.

Example 252 includes the base station of any of examples 244-248, wherein the first parameter is a zero power (ZP) channel state information reference signal (CSI-RS) identifier (ID) that indicates that a ZP CSI-RS resource is present in a slot of a physical channel transmission based on the physical channel RE mapping set.

Example 253 includes the base station of example 252, wherein the ZP CSI-RS ID includes an indication of a slot configuration.

Example 254 includes the base station of any of examples 244-248, wherein the first parameter is an index of a virtual cell identifier (VCID) related to demodulation reference signal (DM-RS) modulation.

Example 255 includes the base station of any of examples 244-248, wherein the first parameter is related to a quasi co-location (QCL) set.

Example 256 includes the base station of any of examples 244-248, wherein the first parameter is a waveform index related to a physical channel transmission based on the physical channel RE mapping set.

Example 257 includes the base station of any of examples 244-248, wherein the first parameter is related to a demodulation reference signal (DM-RS) pattern to be used for demodulation or transmission of a physical channel transmission based on the physical channel RE mapping set.

Example 258 includes the base station of any of examples 244-248, wherein the instructions to select include instructions to select, by a radio resource control (RRC) entity of the base station, the first parameter and the second parameter.

Example 259 includes a user equipment (UE) comprising: a processor; and one or more computer-readable media comprising instructions that, upon execution of the instructions by the processor, are to cause the UE to: identify a media access control (MAC) layer transmission that includes an indication of a physical channel resource element (RE) mapping set, the indication transmitted by a base station; and identify, based on the physical channel RE mapping set, a first parameter and a second parameter related to a physical channel transmission, wherein the first parameter is selected by the base station from a plurality of first parameters, and the second parameter is selected by the base station from a plurality of second parameters.

Example 260 includes the UE of example 259, wherein the physical channel is a physical uplink shared channel (PUSCH) and the RE mapping set indicates a resource on which a PUSCH transmission may be transmitted.

Example 261 includes the UE of example 260, wherein the instructions are further to transmit a PUSCH transmission on a resource indicated by the physical channel RE mapping set.

Example 262 includes the UE of example 259, wherein the physical channel is a physical downlink shared channel (PDSCH) and the RE mapping set indicates a resource on which a PDSCH transmission may be transmitted.

Example 263 includes the UE of example 262, wherein the instructions are further to identify a PDSCH transmission received from the base station on a resource indicated by the physical channel RE mapping set.

Example 264 includes the UE of any of examples 259-263, wherein the first parameter is a physical channel starting symbol that indicates a starting position of a physical channel transmission based on the physical channel RE mapping set.

Example 265 includes the UE of any of examples 259-263, wherein the first parameter is a physical channel end symbol that indicates a duration of a physical channel transmission based on the physical channel RE mapping set.

Example 266 includes the UE of any of examples 259-263, wherein the first parameter is a number of physical channel symbols that indicate a duration of a physical channel transmission based on the physical channel RE mapping set.

Example 267 includes the UE of any of examples 259-263, wherein the first parameter is a zero power (ZP) channel state information reference signal (CSI-RS) identifier (ID) that indicates that a ZP CSI-RS resource is present in a slot of a physical channel transmission based on the physical channel RE mapping set.

Example 268 includes the UE of example 267, wherein the ZP CSI-RS ID includes an indication of a slot configuration.

Example 269 includes the UE of any of examples 259-263, wherein the first parameter is an index of a virtual cell identifier (VCID) related to demodulation reference signal (DM-RS) modulation.

Example 270 includes the UE of any of examples 259-263, wherein the first parameter is related to a quasi co-location (QCL) set.

Example 271 includes the UE of any of examples 259-263, wherein the first parameter is a waveform index related to a physical channel transmission based on the physical channel RE mapping set.

Example 272 includes the UE of any of examples 259-263, wherein the first parameter is related to a demodulation reference signal (DM-RS) pattern to be used for demodulation or transmission of a physical channel transmission based on the physical channel RE mapping set.

Example 273 includes the method of PDSCH/PUSCH RE mapping indication for user equipment, wherein method includes: RRC configuration of 'M' PDSCH/PUSCH RE mapping sets; Optional MAC CE based selection of 'N' PDSCH/PUSCH RE mapping subsets from 'M' configured set; and DCI based indication of one PDSCH/PUSCH set from 'N' selected subset using log 2(M) bits.

Example 274 includes the method of example 273 or some other example herein, wherein each PDSCH/PUSCH Re mapping set contains at least one of the following parameters: PDSCH/PUSCH starting symbol; PDSCH/PUSCH end symbol or number of PDSCH/PUSCH symbol; ZP CSI-RS ID without subframe configuration or optional subframe configuration; Index of VCID for DM-RS modulation; Two or more QCL sets; Waveform index; and DM-RS pattern.

Example 275 includes the method of example 274 or some other example herein, wherein PDSCH/PUSCH starting symbol indicates the starting position for PDSCH/PUSCH mapping in the slot.

Example 276 includes the method of example 274 or some other example herein, wherein PDSCH/PUSCH end symbol or number of PDSCH/PUSCH symbol indicates the duration of PDSCH/PUSCH transmission for a given PDSCH RE mapping set.

Example 277 includes the method of example 274 or some other example herein, wherein ZP CSI-RS ID indicate the presence of the ZP CSI-RS resource in a given subframe for both DL and UL. The indication of ZP CSI-RS for UL is required for dynamic TDD scenario when the collision with UL transmission should be avoided.

Example 278 includes the method of example 274 or some other example herein, wherein Index of VCID is used to indicate one value of VCID that UE to be used for DM-RS modulation for both DL and UL.

Example 279 includes the method of example 274 or some other example herein, wherein QCL set containing IDs of other wideband RS.

Example 280 includes the method of example 274 or some other example herein, wherein Waveform index is used to indicate the waveform for PUSCH transmission between CP-OFDM and DFT-s-OFDM waveform.

Example 281 includes the method of example 274 or some other example herein, wherein DM-RS pattern is used to indicate the assumed DM-RS pattern that UE should use for demodulation or signal transmission.

Example 282 includes the method of example 274 or some other example herein, wherein the default values are used in the absence of RRC configuration of PDSCH/PUSCH parameters UE should use default assumptions for PDSCH/PUSCH Re mapping defined in the spec. For example, the following assumption can be defined.

Example 283 includes the method of example 282 or some other example herein, wherein the default values are set according to: PDSCH/PUSCH starting symbol of L=3 for DL and L=0 for UL; PDSCH/PUSCH end symbol or number of PDSCH/PUSCH symbol according to the duration of the DL or UL slot; if configured, only ZP CSI-RS with subframe configuration is present for DL slot according to configuration; VCID=PCID or PCID+SS block, for DM-RS modulation for DM-RS modulation for both DL and UL; QCL of DM-RS antenna port with antenna port of the detected SS block of the serving cell; and Waveform=CP-OFDM in DL and DFT-s-OFDM for UL.

Example 284 includes a method of PDSCH/PUSCH RE mapping indication for user equipment, wherein the method includes: RRC configuration of 'M' PDSCH/PUSCH RE mapping sets; optional MAC CE based selection of 'N' PDSCH/PUSCH RE mapping subsets from 'M' configured set; scheduling of PDSCH or PUSCH by DCI with indication of one PDSCH/PUSCH RE mapping set from 'N' selected subset; and determination of REs for PDSCH I PUSCH not overlapping with ZP units indicated by ZP resource.

Example 285 may include the method of example 284 or some other example herein, wherein each PDSCH/PUSCH RE mapping set contains at least zero power ZP resource comprising: type of Zero Power (ZP) resource element (REs) unit; bitmap for ZP REs units; ZP resource slot configuration (optional); or allocated PRBs (optional).

Example 286 may include the method of example 285 or some other example herein, wherein ZP RE unit comprising M×N REs containing M adjacent in frequency REs and N adjacent in time REs.

Example 287 may include the method of example 286 or some other example herein, where M×N are at least one of 2×1, 2×2 and 1×1.

Example 288 may include the method of example 285 or some other example herein, wherein each bit in the bitmap corresponds to one ZP RE unit in the PRB.

Example 289 may include the method of example 288 or some other example herein, wherein the ZP units are indexed within a slot in frequency first and in time second.

Example 290 may include the method of example 288 or some other example herein, wherein the ZP units are indexed within a slot in time first and in frequency second.

Example 291 may include the method of example 288 or some other example herein, wherein the allocated PRBs is bitmap or other signaling indicating which PRBs or set of PRBs with granularity of L adjacent PRBs in the frequency domain are used by ZP resource.

Example 292 may include the method of example 288 or some other example herein, wherein ZP resource slot configuration comprising joint configuration of slot offset and slot periodicity.

Example 293 may include the method of example 292 or some other example herein, wherein the minimum slot periodicity supported by ZP resource is 1 slot.

Example 294 may include the method of example 284 or some other example herein, wherein in case of ZP REs resource collision with other reference signals UE should assume the reference signal is present and ZP resource is dropped.

Example 295 may include the method of example 294 or some other example herein, wherein if ZP resource indicates ZP REs unit colliding with at least one of NZP CSI-RS, DM-RS, TRS or PT-RS, UE should assume that ZP RE is dropped and NZP CSI-RS, DM-RS, TRS or PT-RS is present.

Example 296 may include the method of example 284 or some other example herein, wherein in case of ZP REs resource collision with other reference signals UE should assume the reference signal is dropped and ZP resource is present.

Example 297 may include the method of example 285 or some other example herein, wherein ZP RE units bitmap comprising 1st bitmap of length 6 for frequency domain where each bit corresponds to two frequency adjacent REs in PRB, and 2nd bitmap of length 14 for time domain, where each bit corresponds to OFDM symbol in PRB. The ZP CSI-RS configuration for PRBs is Kronecker product of two vectors.

Example 298 may include the method of example 284 or some other example herein, wherein interference measurement resource (CSI-IM) can be configured with periodicity of 1 slot.

Example 299 may include an apparatus comprising: means for determining a configuration, the configuration including M number of Physical Downlink Shared Channel (PDSCH)/Physical Uplink Shared Channel (PUSCH) Resource Element (RE) mapping sets; means for generating a radio resource control (RRC) message to include the configuration; and transmission means for transmitting the RRC message.

Example 300 may include the apparatus of example 299 or some other example herein, wherein the transmission means is for transmitting a Media Access Control (MAC) control element (CE) to indicate a selection of N number of PD SCH/PUSCH RE mapping sets of the M number of PDSCH/PUSCH RE mapping sets.

Example 301 may include the apparatus of example 300 or some other example herein, wherein the transmission means is for transmitting Downlink Control Information (DCI) for scheduling of PDSCH or PUSCH including an indication of one PDSCH/PUSCH RE mapping set from the N number of PDSCH/PUSCH RE mapping sets.

Example 302 may include the apparatus of examples 299-301 or some other example herein, wherein the means for determining the configuration is for determining REs for PDSCH and/or PUSCH that do not overlap with zero power (ZP) units indicated by a ZP resource.

Example 303 may include the apparatus of examples 299-302 or some other example herein, wherein the configuration indicates, for each PDSCH/PUSCH RE mapping set, the following parameters: a number of cell-specific reference signal (CRS) ports; a CRS shift; a Multicast-broadcast single frequency network (MBSFN) subframe configuration; a PDSCH starting symbol; a ZP channel state information (CSI)-reference signal (RS) configuration (which may be or include a ZP CSI-RS resource identity (ID) with a subframe configuration); and IDs of quasi co-located (QCL-ed) signals.

Example 304 may include the apparatus of examples 299-303 or some other example herein, wherein the configuration is to indicate, for each PDSCH/PUSCH RE mapping set the following parameters: a ZP RE unit type; a ZP RE bitmap, where each bit in the ZP RE bitmap corresponds to one ZP RE unit of a plurality of ZP RE units; a ZP resource slot configuration; and allocated physical resource blocks (PRBs).

Example 305 may include the apparatus of example 304 or some other example herein, wherein each ZP RE unit of the plurality of ZP RE units comprises M×N REs including M number of REs that are adjacent in frequency and N number of adjacent REs in time.

Example 306 may include the apparatus of example 305 or some other example herein, wherein M×N is at least one of 2×1, 2×2 and 1×1.

Example 307 may include the apparatus of example 304 or some other example herein, wherein each bit in the ZP RE bitmap corresponds to one ZP RE unit in the allocated PRBs.

Example 308 may include the apparatus of example 307 or some other example herein, wherein the means for determining the configuration is for indexing the ZP RE units within a slot including indexing ZP REs in frequency before indexing ZP REs in time.

Example 309 may include the apparatus of example 307 or some other example herein, wherein the means for determining the configuration is for indexing the ZP RE units within a slot including indexing ZP REs in time before indexing ZP REs in frequency.

Example 310 may include the apparatus of example 307 or some other example herein, wherein the allocated PRBs is indicated by the bitmap or other signaling indicating which PRBs or set of PRBs with granularity of L adjacent PRBs in the frequency domain are used by the ZP resource.

Example 311 may include the apparatus of example 307 or some other example herein, wherein the ZP resource slot configuration comprises a slot offset and slot periodicity.

Example 312 may include the apparatus of example 311 or some other example herein, wherein the slot periodicity is a minimum slot periodicity supported by a ZP resource, wherein the minimum slot periodicity is 1 slot.

Example 313 may include the apparatus of examples 300-312 or some other example herein, wherein a reference signal (RS) is assumed to be present and the ZP resource is dropped when the ZP RE resource collides with the RS.

Example 314 may include the apparatus of examples 300-312 or some other example herein wherein a ZP resource is assumed to be present and an RS is dropped when the ZP RE resource collides with the RS.

Example 315 may include the apparatus of examples 313-314 or some other example herein, wherein the RS comprises a non-ZP (NZP) CSI-RS, demodulation RS (DM-RS), tracking (TRS), and/or phase tracking RS (PT-RS).

Example 316 may include the apparatus of examples 304-315 or some other example herein, wherein the ZP RE bitmap comprises: a first bitmap of length 6 in a frequency domain where each bit in the first bitmap corresponds to two frequency adjacent REs in an allocated PRB, and a second bitmap of length 14 in a time domain, where each bit in the second bitmap corresponds to orthogonal frequency division multiplexing (OFDM) symbol in the allocated PRB.

Example 317 may include the apparatus of example 316 or some other example herein, wherein the means for determining the configuration is for determining the ZP CSI-RS configuration for PRBs as a Kronecker product of two vectors, wherein each of the two vectors correspond to the first and second bitmaps, respectively.

Example 318 may include the apparatus of examples 299-317 or some other example herein, wherein the means for determining the configuration is for determining a CSI interference measurement (CSI-IM) resource with a periodicity of 1 slot.

Example 319 may include the apparatus of examples 299-318 or some other example herein, wherein the apparatus is implemented in or by a next generation NodeB (gNB) or a New Radio (NR) Radio Access Network (RAN) node.

Example 320 includes a baseband circuitry for use in a base station, the baseband circuitry comprising: a processor to: identify a parameter related to a zero power (ZP) resource element (RE) mapping set in a physical resource block (PRB), wherein the ZP RE mapping set relates to resources that are not to be used to transmit a physical channel transmission; identify an indication of the ZP RE mapping set; and generate a baseband signal related to the indication of the ZP RE mapping set; and a radio frequency (RF) interface coupled with the processor, the RF interface to facilitate transmission of an indication of the ZP RE mapping set to a user equipment (UE) based on instructions received from the processor.

Example 321 includes the baseband circuitry of example 320, wherein the ZP RE mapping set is one of a plurality of ZP RE mapping sets that have been previously indicated to a UE by a radio resource layer (RRC) signal, and wherein the indication is an indication of a subset of the plurality of ZP RE mapping sets, wherein the subset includes the ZP RE mapping set.

Example 322 includes the baseband circuitry of examples 320 or 321, wherein the physical channel transmission is a physical downlink shared channel (PDSCH) transmission and the RF interface is further to facilitate transmission, to the UE based on the parameter related to the ZP RE mapping set, of a portion of the physical channel transmission based on ZP REs in the ZP RE mapping set.

Example 323 includes the baseband circuitry of examples 320 or 321, wherein the physical channel transmission is a physical uplink shared channel (PUSCH) transmission and the processor is further to identify, based on the parameter related to the ZP RE mapping set, a portion of the physical channel transmission received from the UE, wherein the portion of the physical channel transmission is transmitted by the UE based on ZP REs in the ZP RE mapping set.

Example 324 includes the baseband circuitry of examples 320 or 321, wherein the RF circuitry is further to facilitate transmission of the baseband signal in a downlink control information (DCI) transmission or a slot configuration transmission.

Example 325 includes the baseband circuitry of examples 320 or 321, wherein the indication of the ZP RE mapping set is a bitmap related to the ZP RE mapping set.

Example 326 includes the baseband circuitry of example 325 wherein the bitmap is related to a location of the ZP RE mapping set in a frequency domain within the PRB, and the bitmap is unrelated to a location of the ZP RE mapping set in a time domain.

Example 327 includes a baseband circuitry for use in a user equipment (UE), wherein the baseband circuitry comprises: a radio frequency (RF) interface to receive baseband signals related to a transmission received from a base station; and a processor coupled with the RF interface, the processor to identify, based on the baseband signals, an indication related to a zero power (ZP) resource element (RE) mapping set in a physical resource block (PRB), wherein the ZP RE mapping set relates to a physical channel transmission and is based on a parameter identified by the base station.

Example 328 includes the baseband circuitry of example 327, wherein the ZP RE mapping set is one of a plurality of ZP RE mapping sets that have been previously indicated to a UE by a radio resource layer (RRC) signal, and wherein the indication is an indication of a subset of the plurality of ZP RE mapping sets, wherein the subset includes the ZP RE mapping set.

Example 329 includes the baseband circuitry of example 327, wherein the parameter is configured by a radio resource control (RRC) entity of the base station.

Example 330 includes the baseband circuitry of any of examples 327-329, wherein the indication of the ZP RE mapping set is a bitmap related to the ZP RE mapping set.

Example 331 includes the baseband circuitry of example 330, wherein the bitmap is related to a location of the ZP RE mapping set in a frequency domain within the PRB, and the bitmap is unrelated to a location of the ZP RE mapping set in a time domain.

Example 332 includes one or more computer-readable media comprising instructions that, upon execution of the instructions by one or more processors of a base station, are to cause the base station to: identify a parameter related to a zero power (ZP) resource element (RE) mapping set in a physical resource block (PRB), wherein the ZP RE mapping set relates to resources that are not to be used to transmit a physical channel transmission; and transmit, to a user equipment (UE), an indication of the ZP RE mapping set.

Example 333 includes the one or more computer-readable media of example 332, wherein the ZP RE mapping set is one of a plurality of ZP RE mapping sets that have been previously indicated to a UE by a radio resource layer (RRC) signal, and wherein the indication is an indication of a subset of the plurality of ZP RE mapping sets, wherein the subset includes the ZP RE mapping set.

Example 334 includes the one or more computer-readable media of examples 332 or 333, wherein the physical channel transmission is a physical downlink shared channel (PDSCH) transmission and the instructions are further to transmit, to the UE based on the parameter related to the ZP RE mapping set, a portion of the physical channel transmission based on ZP REs in the ZP RE mapping set.

Example 335 includes the one or more computer-readable media of examples 332 or 333, wherein the physical channel transmission is a physical uplink shared channel (PUSCH) transmission and the instructions are further to identify, based on the parameter related to the ZP RE mapping set, a portion of the physical channel transmission received from the UE, wherein the portion of the physical channel transmission is transmitted by the UE based on ZP REs in the ZP RE mapping set.

Example 336 includes the one or more computer-readable media of examples 332 or 333, wherein the instructions are further to transmit the indication of the ZP RE mapping set in a downlink control information (DCI) transmission or a slot configuration transmission.

Example 337 includes the one or more computer-readable media of examples 332 or 333, wherein the indication of the ZP RE mapping set is a bitmap related to the ZP RE mapping set.

Example 338 includes the one or more computer-readable media of examples 332 or 333, wherein the parameter is related to a number of PRBs allocated for transmission of the ZP RE mapping set, related to a slot configuration for the transmission of the ZP RE mapping set, related to a slot offset of the ZP RE mapping set, related to a slot periodicity of the ZP RE mapping set, or has a slot-level granularity.

Example 339 includes an apparatus for use in a user equipment (UE), wherein the apparatus comprises: means to receive, from radio frequency (RF) circuitry of the UE, a baseband signal related to a transmission received from a base station; and means to identify, based on the baseband signal, an indication related to a zero power (ZP) resource element (RE) mapping set in a physical resource block (PRB), wherein the ZP RE mapping set relates to a physical channel transmission and is based on a parameter identified by the base station.

Example 340 includes the apparatus of example 339, wherein the ZP RE mapping set is one of a plurality of ZP RE mapping sets that have been previously indicated to a UE by a radio resource layer (RRC) signal, and wherein the indication is an indication of a subset of the plurality of ZP RE mapping sets, wherein the subset includes the ZP RE mapping set.

Example 341 includes the apparatus of example 339, wherein the ZP RE mapping set is related to a channel state information reference signal (CSI-RS) resource transmitted on 2 antenna ports or 3 antenna ports.

Example 342 includes the apparatus of example 339, wherein the parameter is configured by a radio resource control (RRC) entity of the base station.

Example 343 includes the apparatus of any of examples 339-342, wherein the indication of the ZP RE mapping set is a bitmap related to the ZP RE mapping set.

Example 344 includes the apparatus of any of examples 339-342, wherein the physical channel transmission is a physical downlink shared channel (PDSCH) transmission or a physical uplink shared channel (PUSCH) transmission.

Example 345 may include an apparatus comprising means to perform one or more elements of a method described in or related to any of examples 1-344, or any other method or process described herein.

Example 346 may include one or more non-transitory computer-readable media comprising instructions to cause an electronic device, upon execution of the instructions by one or more processors of the electronic device, to perform one or more elements of a method described in or related to any of examples 1-344, or any other method or process described herein.

Example 347 may include an apparatus comprising logic, modules, or circuitry to perform one or more elements of a method described in or related to any of examples 1-344, or any other method or process described herein.

Example 348 may include a method, technique, or process as described in or related to any of examples 1-344, or portions or parts thereof.

Example 349 may include an apparatus comprising: one or more processors and one or more computer readable media comprising instructions that, when executed by the one or more processors, cause the one or more processors to perform the method, techniques, or process as described in or related to any of examples 1-344, or portions thereof.

Example 350 may include a signal as described in or related to any of examples 1-344, or portions or parts thereof.

Example 351 may include a signal in a wireless network as shown and described herein.

Example 352 may include a method of communicating in a wireless network as shown and described herein.

Example 353 may include a system for providing wireless communication as shown and described herein.

Example 354 may include a device for providing wireless communication as shown and described herein.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize.

These modifications may be made to the invention in light of the above detailed description. The terms used in the following claims should not be construed to limit the invention to the specific implementations disclosed in the specification and the claims. Rather, the scope of the invention is to be determined entirely by the following claims, which are to be construed in accordance with established doctrines of claim interpretation.

What is claimed is:

1. A baseband circuitry for use in a base station, the baseband circuitry comprising:
    a processor to:
        identify a parameter related to a zero power (ZP) resource element (RE) mapping set in a physical resource block (PRB), wherein the ZP RE mapping set relates to resources that are not to be used to transmit a physical channel transmission;
        identify an indication of the ZP RE mapping set, wherein the indication indicates two separate bitmaps related to the ZP RE mapping set and the two separate bitmaps include a first bitmap related to a frequency domain and a second bitmap related to a time domain; and
        generate a baseband signal related to the indication of the ZP RE mapping set; and
    a radio frequency (RF) interface coupled with the processor, the RF interface to facilitate transmission of the indication of the ZP RE mapping set to a user equipment (UE) based on instructions received from the processor.

2. The baseband circuitry of claim 1, wherein the ZP RE mapping set is one of a plurality of ZP RE mapping sets that have been previously indicated to a UE by a radio resource layer (RRC) signal, and wherein the indication is an indication of a subset of the plurality of ZP RE mapping sets, wherein the subset includes the ZP RE mapping set.

3. The baseband circuitry of claim 1, wherein the physical channel transmission is a physical downlink shared channel (PDSCH) transmission and the RF interface is further to facilitate transmission, to the UE based on the parameter related to the ZP RE mapping set, of a portion of the physical channel transmission based on ZP REs in the ZP RE mapping set.

4. The baseband circuitry of claim 1, wherein the physical channel transmission is a physical uplink shared channel (PUSCH) transmission and the processor is further to identify, based on the parameter related to the ZP RE mapping set, a portion of the physical channel transmission received from the UE, wherein the portion of the physical channel transmission is transmitted by the UE based on ZP REs in the ZP RE mapping set.

5. The baseband circuitry of claim 1, wherein the RF interface is further to facilitate transmission of the baseband signal in a downlink control information (DCI) transmission or a slot configuration transmission.

6. The baseband circuitry of claim 1, wherein each bit in the first bitmap corresponds to two frequency adjacent ZP REs in the PRB and each bit in the second bitmap corresponds to an orthogonal frequency division multiplexing (OFDM) symbol in the PRB, and a ZP channel state information reference signal (CSI-RS) configuration for the PRB is related to a Kronecker product of two vectors, where each of the two vectors correspond to the first and second bitmap respectively.

7. A baseband circuitry for use in a user equipment (UE), wherein the baseband circuitry comprises:
    a radio frequency (RF) interface to receive baseband signals related to a transmission received from a base station; and
    a processor coupled with the RF interface, the processor to identify, based on the baseband signals, an indication related to a zero power (ZP) resource element (RE) mapping set in a physical resource block (PRB), wherein the indication indicates two separate bitmaps related to the ZP RE mapping set and the two separate bitmaps include a first bitmap related to a frequency domain and a second bitmap related to a time domain; and
    wherein the ZP RE mapping set relates to a physical channel transmission and is based on a parameter identified by the base station.

8. The baseband circuitry of claim 7, wherein the ZP RE mapping set is one of a plurality of ZP RE mapping sets that have been previously indicated to a UE by a radio resource layer (RRC) signal, and wherein the indication is an indication of a subset of the plurality of ZP RE mapping sets, wherein the subset includes the ZP RE mapping set.

9. The baseband circuitry of claim 7, wherein the parameter is configured by a radio resource control (RRC) entity of the base station.

10. The baseband circuitry of claim 7, wherein each bit in the first bitmap corresponds to two frequency adjacent ZP REs in the PRB and each bit in the second bitmap corresponds to an orthogonal frequency division multiplexing (OFDM) symbol in the PRB, and a ZP channel state information reference signal (CSI-RS) configuration for the PRB is related to a Kronecker product of two vectors, where each of the two vectors correspond to the first and second bitmap respectively.

11. One or more computer-readable media comprising instructions that, upon execution of the instructions by one or more processors of a base station, are to cause the base station to:

identify a parameter related to a zero power (ZP) resource element (RE) mapping set in a physical resource block (PRB), wherein the ZP RE mapping set relates to resources that are not to be used to transmit a physical channel transmission; and transmit, to a user equipment (UE), an indication of the ZP RE mapping set, wherein the indication indicates two separate bitmaps related to the ZP RE mapping set and the two separate bitmaps include a first bitmap related to a frequency domain and a second bitmap related to a time domain.

12. The one or more computer-readable media of claim 11, wherein the ZP RE mapping set is one of a plurality of ZP RE mapping sets that have been previously indicated to a UE by a radio resource layer (RRC) signal, and wherein the indication is an indication of a subset of the plurality of ZP RE mapping sets, wherein the subset includes the ZP RE mapping set.

13. The one or more computer-readable media of claim 11, wherein the physical channel transmission is a physical downlink shared channel (POSCH) transmission and the instructions are further to transmit, to the UE based on the parameter related to the ZP RE mapping set, a portion of the physical channel transmission based on ZP REs in the ZP RE mapping set.

14. The one or more computer-readable media of claim 11, wherein the physical channel transmission is a physical uplink shared channel (PUSCH) transmission and the instructions are further to identify, based on the parameter related to the ZP RE mapping set, a portion of the physical channel transmission received from the UE, wherein the portion of the physical channel transmission is transmitted by the UE based on ZP REs in the ZP RE mapping set.

15. The one or more computer-readable media of claim 11, wherein the instructions are further to transmit the indication of the ZP RE mapping set in a downlink control information (DCI) transmission or a slot configuration transmission.

16. The one or more computer-readable media of claim 11, wherein
each bit in the first bitmap corresponds to two frequency adjacent ZP REs in the PRB and each bit in the second bitmap corresponds to an orthogonal frequency division multiplexing (OFDM) symbol in the PRB, and a ZP channel state information reference signal (CSI-RS) configuration for the PRB is related to a Kronecker product of two vectors, where each of the two vectors correspond to the first and second bitmap respectively.

17. The one or more computer-readable media of claim 11, wherein the parameter is related to a number of PRBs allocated for transmission of the ZP RE mapping set, related to a slot configuration for the transmission of the ZP RE mapping set, related to a slot offset of the ZP RE mapping set, related to a slot periodicity of the ZP RE mapping set, or has a slot-level granularity.

18. An apparatus for use in a user equipment (UE), wherein the apparatus comprises:
means to receive, from radio frequency (RF) circuitry of the UE, a baseband signal related to a transmission received from a base station; and
means to identify, based on the baseband signal, an indication related to a zero power (ZP) resource element (RE) mapping set in a physical resource block (PRB), wherein the indication indicates two separate bitmaps related to the ZP RE mapping set and the two separate bitmaps include a first bitmap related to a frequency domain and a second bitmap related to a time domain, and wherein the ZP RE mapping set relates to a physical channel transmission and is based on a parameter identified by the base station.

19. The apparatus of claim 18, wherein the ZP RE mapping set is one of a plurality of ZP RE mapping sets that have been previously indicated to a UE by a radio resource layer (RRC) signal, and wherein the indication is an indication of a subset of the plurality of ZP RE mapping sets, wherein the subset includes the ZP RE mapping set.

20. The apparatus of claim 18, wherein the ZP RE mapping set is related to a channel state information reference signal (CSI-RS) resource transmitted on 2 antenna ports or 3 antenna ports.

21. The apparatus of claim 18, wherein the parameter is configured by a radio resource control (RRC) entity of the base station.

22. The apparatus of claim 18, wherein
each bit in the first bitmap corresponds to two frequency adjacent ZP REs in the PRB and each bit in the second bitmap corresponds to an orthogonal frequency division multiplexing (OFDM) symbol in the PRB, and a ZP channel state information reference signal (CSI-RS) configuration for the PRB is related to a Kronecker product of two vectors, where each of the two vectors correspond to the first and second bitmap respectively.

23. The apparatus of claim 18, wherein the physical channel transmission is a physical downlink shared channel (PDSCH) transmission or a physical uplink shared channel (PUSCH) transmission.

* * * * *